United States Patent
Kusase et al.

(10) Patent No.: US 9,979,267 B2
(45) Date of Patent: May 22, 2018

(54) DOUBLE-STATOR ROTATING ELECTRIC MACHINE

(71) Applicant: DENSO CORPORATION, Kariya, Aichi-pref (JP)

(72) Inventors: Shin Kusase, Obu (JP); Keiji Kondou, Nagoya (JP); Takeo Maekawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 160 days.

(21) Appl. No.: 14/802,630

(22) Filed: Jul. 17, 2015

(65) Prior Publication Data
US 2016/0028296 A1    Jan. 28, 2016

(30) Foreign Application Priority Data
Jul. 22, 2014   (JP) .................. 2014-148997

(51) Int. Cl.
*H02K 3/12* (2006.01)
*H02K 16/04* (2006.01)
*H02K 1/27* (2006.01)
*H02K 21/12* (2006.01)

(52) U.S. Cl.
CPC ............ *H02K 16/04* (2013.01); *H02K 1/27* (2013.01); *H02K 3/12* (2013.01); *H02K 21/12* (2013.01); *H02K 2213/03* (2013.01)

(58) Field of Classification Search
CPC ............ H02K 16/04; H02K 1/27; H02K 3/12; H02K 21/12

USPC ............ 310/156.53, 156.01, 266, 114, 102
See application file for complete search history.

(56) References Cited

U.S. PATENT DOCUMENTS

| 5,751,089 A * | 5/1998 | Stridsberg | H02K 1/185 310/266 |
| 2014/0159533 A1* | 6/2014 | Kondou | H02K 1/276 310/156.53 |

FOREIGN PATENT DOCUMENTS

| JP | H07-213044 A | 8/1995 |
| JP | 2007-261342 A | 10/2007 |

* cited by examiner

*Primary Examiner* — Terrance Kenerly
(74) *Attorney, Agent, or Firm* — Oliff PLC

(57) ABSTRACT

A double-stator rotating electric machine includes a rotor and a pair of outer and inner stators. The outer stator has a first multi-phase coil wound thereon so as to form magnetic poles upon energization of the first multi-phase coil. The inner stator has a second multi-phase coil wound thereon so as to form magnetic poles upon energization of the second multi-phase coil. The number of the magnetic poles formed by the outer stator is equal to the number of the magnetic poles formed by the inner stator. Each of the magnetic poles formed by the outer stator is located at the same circumferential position as and has an opposite polarity to a corresponding one of the magnetic poles formed by the inner stator. The rotor has yoke portions each of which radially extends so as to form a magnetic flux passage magnetically connecting the outer and inner stators.

10 Claims, 14 Drawing Sheets

⊙ : ELECTRIC CURRENT FLOWING IN DIRECTION OUT OF PARER SURFACE
⊗ : ELECTRIC CURRENT FLOWING IN DIRECTION INTO OF PARER SURFACE

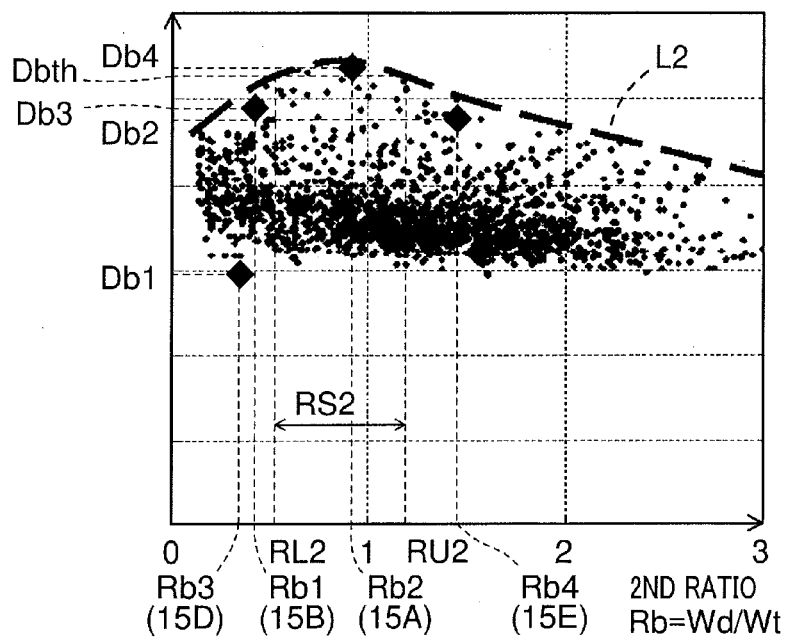
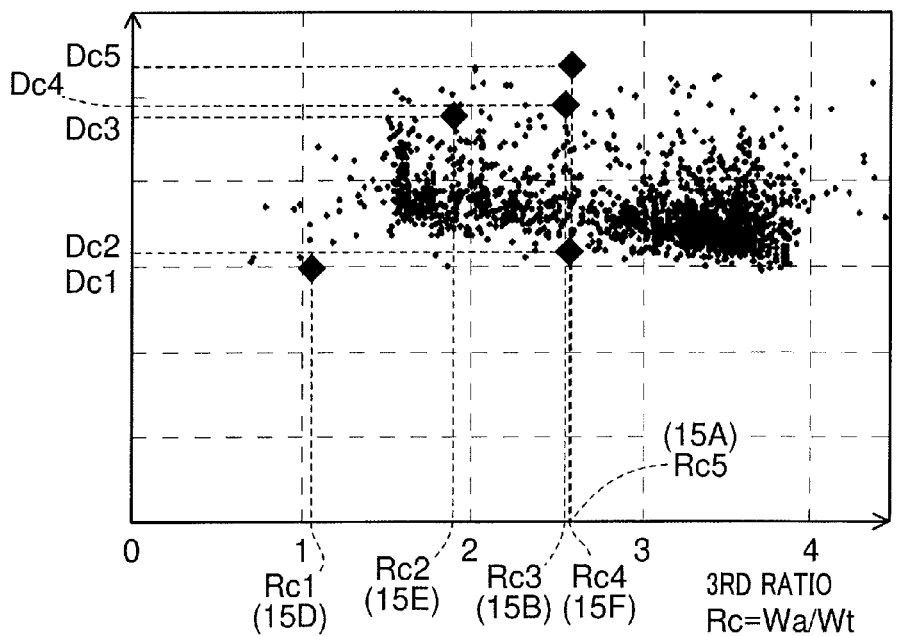

DOUBLE-STATOR ROTATING ELECTRIC MACHINE

CROSS-REFERENCE TO RELATED APPLICATION

This application is based on and claims priority from Japanese Patent Application No. 2014-148997 filed on Jul. 22, 2014, the content of which is hereby incorporated by reference in its entirety into this application.

BACKGROUND

1. Technical Field

The present invention relates to double-stator rotating electric machines which include a rotor, an outer stator disposed radially outside the rotor, and an inner stator disposed radially inside the rotor.

2. Description of Related Art

Japanese Patent Application Publication No. JP2007261342A discloses an in-wheel motor which includes a rotor and a pair of outer and inner stators. The rotor is connected to a wheel shaft so as to rotate together with the wheel shaft. The outer stator is fixed to a housing so as to be positioned radially outside the rotor with an outer gap formed therebetween. The inner stator is fixed to the housing so as to be positioned radially inside the rotor with an inner gap formed therebetween. That is to say, the in-wheel motor is a double-gap and double-stator motor.

Moreover, in the in-wheel motor, the outer stator includes a plurality of iron cores each having a coil wound thereon. The inner stator includes an iron core having a plurality of protruding pieces; each of the protruding pieces has a coil wound thereon. The rotor includes an annular rotor core, a plurality of outer permanent magnets and a plurality of inner permanent magnets. The rotor core is formed by laminating a plurality of thin steel sheets. The rotor core has a plurality of fitting holes that are formed in a radially outer surface of the rotor core along a circumferential direction of the rotor core. Each of the outer permanent magnets is fitted in one of the fitting holes of the rotor core. Each of the inner permanent magnets is attached on a radially inner surface of the rotor core along the circumferential direction so as to be radially aligned with one of the outer permanent magnets.

With the outer and inner permanent magnets, it is possible to generate a large magnet torque. Moreover, the rotor core has an annular yoke portion that magnetically connects each adjacent pair of magnetic poles formed by the permanent magnets. Therefore, as viewed from the stators, the reluctance of the magnetic flux passage of the rotor is small, i.e., the d-axis (or direct-axis) inductance is large in comparison with the case of a rotor core having no annular yoke portion. However, since the surfaces of the rotor core are occupied by the magnetic poles formed by the permanent magnets, there is almost no space left for the q-axis (or quadrature-axis) magnetic flux to flow through. That is, the q-axis inductance is small. Consequently, the reluctance torque, which increases with decrease in the d-axis inductance and with increase in the q-axis inductance, is accordingly small. As a result, the total torque (i.e., the sum of the magnet torque and the reluctance torque) is small for the size of the motor.

To increase the reluctance torque, one may consider omitting the annular yoke portion from the rotor core. However, in this case, the magnetic flux passages of the outer and inner stators would be serially connected to each other. Moreover, due to the geometric necessity, the magnetic flux passage of the inner stator would be narrower than that of the outer stator. Therefore, the amount of the magnetic flux passing through the outer and inner stators would be limited to a maximum allowable amount which is allowed to pass through the narrower magnetic flux passage of the inner stator. Consequently, the total torque would still be small for the size of the motor.

In addition, in the above in-wheel motor, since the outer permanent magnets are fixed only by being fitted in the fitting holes formed in the radially outer surface of the rotor core, during high-speed rotation of the rotor, it may be difficult to securely retain the outer permanent magnets in the fitting holes against the centrifugal force.

SUMMARY

According to exemplary embodiments, there is provided a double-stator rotating electric machine which includes a rotor, an outer stator and an inner stator. The outer stator is disposed radially outside the rotor with an outer gap formed therebetween. The outer stator has a first multi-phase coil wound thereon. The inner stator is disposed radially inside the rotor with an inner gap formed therebetween. The inner stator has a second multi-phase coil wound thereon. Moreover, the outer stator is configured to form a plurality of magnetic poles upon energization of the first multi-phase coil. The inner stator is configured to form a plurality of magnetic poles upon energization of the second multi-phase coil. The number of the magnetic poles formed by the outer stator is equal to the number of the magnetic poles formed by the inner stator. Each of the magnetic poles formed by the outer stator is located at the same circumferential position as and has an opposite polarity to a corresponding one of the magnetic poles formed by the inner stator, thereby causing magnetic flux to flow in a radial direction of the rotor. The rotor has a plurality of yoke portions each of which radially extends so as to form a magnetic flux passage magnetically connecting the outer and inner stators.

Consequently, with the yoke portions of the rotor magnetically connecting the outer and inner stators, it is possible to secure a high reluctance torque of the rotating electric machine. As a result, it is possible to increase the total torque (i.e., the sum of the magnet torque and the reluctance torque) of the rotating electric machine.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings:

FIG. 7 is a graph illustrating the relationship between a second ratio Rb and the ratio of torque/magnet quantity;

FIG. 8 is a graph illustrating the relationship between a third ratio Re and the ratio of torque/magnet quantity;

DESCRIPTION OF EMBODIMENTS

Figure 1:
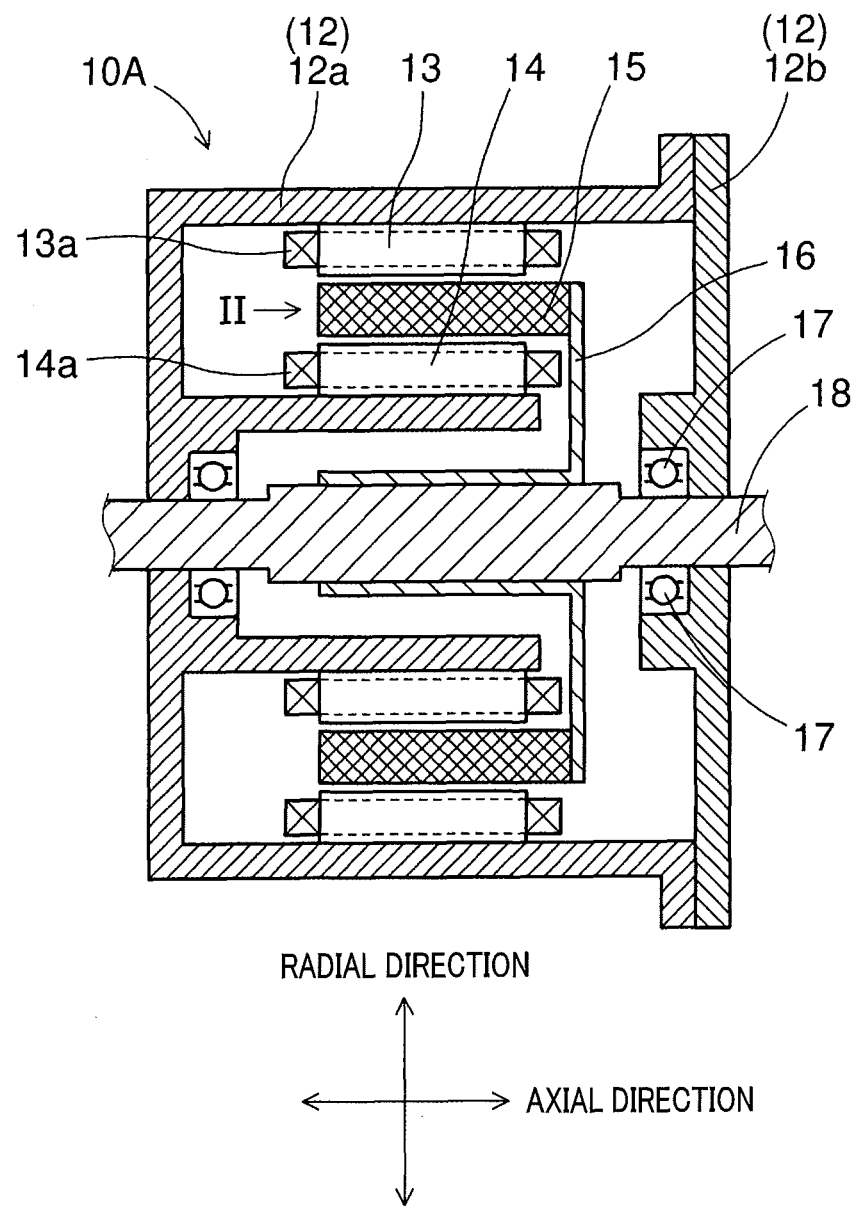
FIG. 1 is a cross-sectional view of a double-stator rotating electric machine according to a first embodiment.

Exemplary embodiments will be described hereinafter with reference to FIGS. 1-23. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a double-stator rotating electric machine 10A according to a first embodiment.

In this embodiment, the rotating electric machine 10A is configured as a motor-generator that selectively functions either as an electric motor or as an electric generator.

As shown in FIG. 1, the rotating electric machine 10A includes a housing 12, an outer stator 13, an inner stator 14, a rotor 15, a disc 16, a pair of bearings 17 and a rotating shaft 18.

The housing 12 includes a main body 12a and a cover 12b. The main body 12a is substantially cup-shaped to have an open end. The cover 12b is disc-shaped and fixed to the main body 12a so as to cover the open end of the main body 12a.

Moreover, in the housing 12, there are provided the pair of bearings 17 via which the rotating shaft 18 is rotatably supported by the housing 12. In addition, the rotating shaft 18 may have any shape suitable for rotation.

The outer stator 13 is fixed to an outer circumferential wall of the housing 12 so as to be positioned radially outside the rotor 15. The inner stator 14 is fixed to an inner circumferential wall of the housing 12 so as to be positioned radially inside the rotor 15. In other words, the outer and inner stators 13 and 14 are radially opposed to each other with the rotor 15 interposed therebetween. In addition, the outer and inner stators 13 and 14 may be fixed to the housing 12 by any suitable fixing means.

The outer stator 13 has a first multi-phase coil (e.g., three-phase coil) 13a wound thereon, while the inner stator 14 has a second multi-phase coil (e.g., three-phase coil) 14a wound thereon. More specifically, the first multi-phase coil 13a is wound on a stator core of the outer stator 13, while the second multi-phase coil 14a is wound on a stator core of the inner stator 14.

The rotor 15 is fixed to the disc 16, and the disc 16 is further fixed to the rotating shaft 18. That is, the rotor 15 is fixed to the rotating shaft 18 via the disc 16. In addition, the rotor 15, the disc 16 and the rotating shaft 18 may be fixed together by any suitable fixing means.

Configuration examples of the rotor 15 will be described later. The disc 16 may have any shape suitable for connecting the rotor 15 and the rotating shaft 18. In the present embodiment, the disc 16 has a hollow cylindrical boss portion formed at a radial center thereof and a flange portion extending radially outward from the boss portion. The rotating shaft 18 is fitted in the hollow space of the boss portion of the disc 16. The rotor 15 is fixed to one surface (i.e., the left surface in FIG. 1) of the flange portion of the disc 16.

Figure 5:
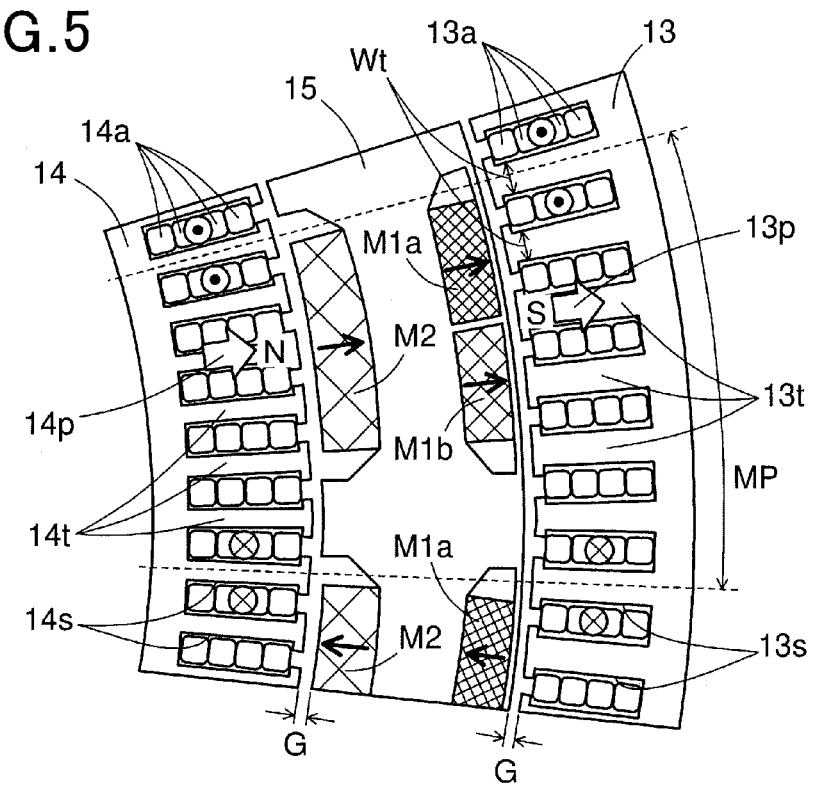
FIG. 5 is a schematic view illustrating both the magnetization direction of permanent magnets of the rotor and the direction of magnetic flux generated upon energization of outer and inner stators of the double-stator rotating electric machine.

Referring to FIG. 5, between the outer stator 13 and the rotor 15, there is formed an annular gap G. Similarly, between the inner stator 14 and the rotor 15, there is also formed an annular gap G.

In addition, with decrease in the gaps G, it becomes easier for magnetic flux to flow across the gaps G, thereby increasing the torque. However, at the same time, it also becomes easier for the rotor 15 to make contact with the outer and inner stators 13 and 14 upon application of a large external force or vibration to the rotating electric machine 10A. Therefore, the gaps G may be preferably set by taking into consideration both ease of the flow of magnetic flux and avoidance of contact between the rotor 15 and the outer and inner stators 13 and 14.

Figure 2:
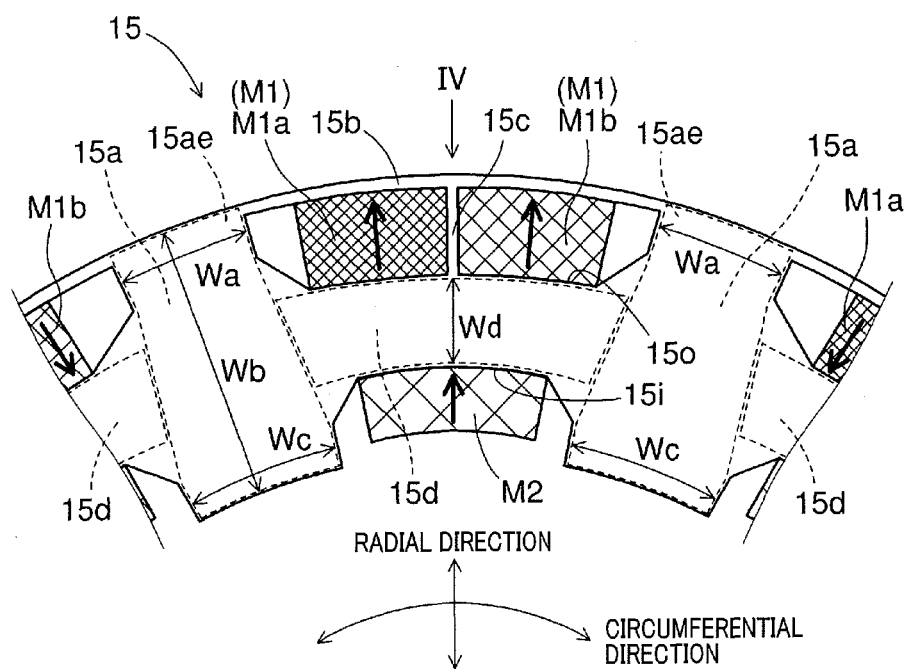
FIG. 2 is an enlarged view, along the direction II in FIG. 1, of part of a rotor of the double-stator rotating electric machine.
Figure 3:
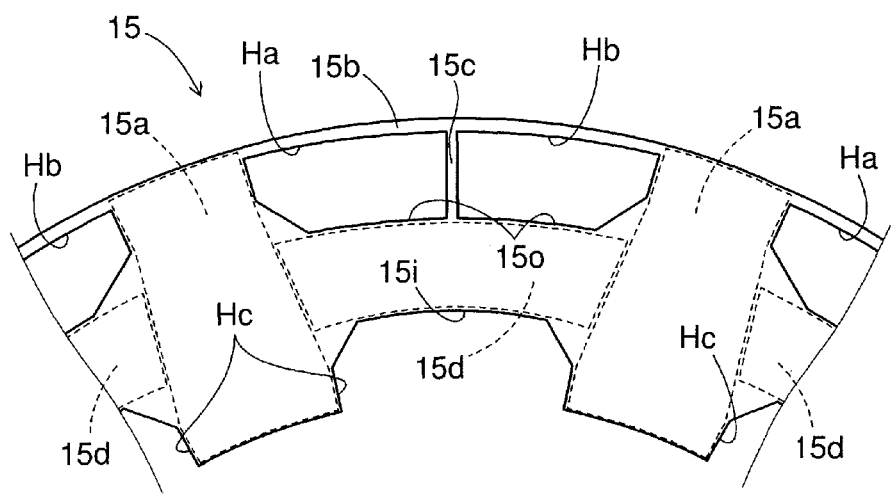
FIG. 3 is an enlarged plan view of part of one of magnetic steel sheets that are laminated to form a rotor core of the rotor.
Figure 4:
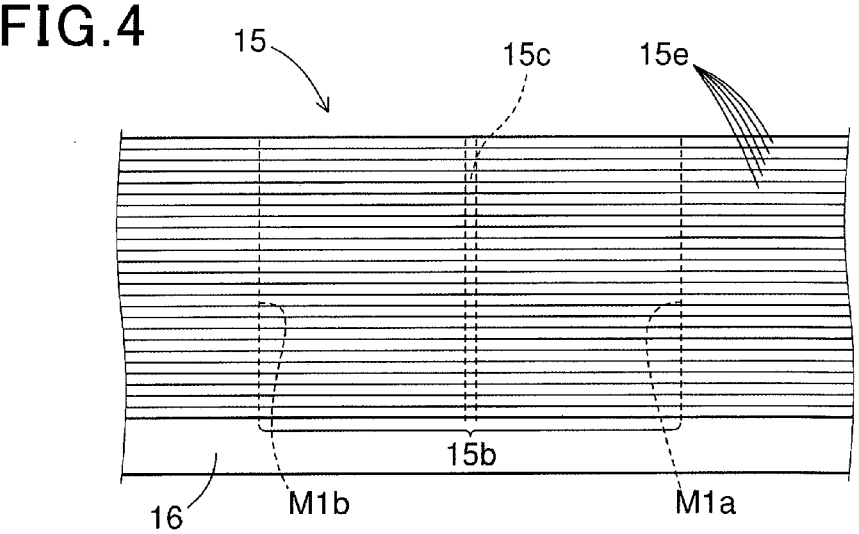
FIG. 4 is a side view, along the direction IV in FIG. 2, of the part of the rotor.

As shown in FIGS. 2-4, in the present embodiment, the rotor 15 includes an annular (or hollow cylindrical) rotor core that has a plurality of first yoke portions 15a and a plurality of second yoke portions 15d. Each of the first yoke portions 15a extends in a radial direction of the rotor 15 (i.e., a radial direction of the annular rotor core). On the other hand, each of the second yoke portions 15d extends in the circumferential direction of the rotor 15 (i.e., the circumferential direction of the annular rotor core). Moreover, the first yoke portions 15a are arranged alternately with the second yoke portions 15d in the circumferential direction of the rotor 15. The number of the first yoke portions 15a (or the number of the second yoke portions 15d) may be suitably set according to the design specification of the rotor 15. In addition, in FIGS. 2-3, each of the first and second yoke portions 15a and 15d is shown with dashed lines.

Moreover, in the present embodiment, as shown in FIG. 2, each of the first yoke portions 15a has a first circumferential width Wa at its radially outer end and a second circumferential width Wc at its radially inner end. The first circumferential width Wa is set to be less than the second circumferential width Wc (i.e., Wa<Wc). Further, as shown in FIG. 5, both the first and second circumferential widths Wa and Wc are set to be greater than the circumferential width Wt of teeth 13t of the outer stator 13 (i.e., Wa>Wt; Wc>Wt). Furthermore, as seen from FIG. 5, the circumferential width Wt of the teeth 13t of the outer stator 13 is greater than the circumferential width of teeth 14t of the inner stator 14. Accordingly, both the first and second circumferential widths Wa and Wc are also greater than the circumferential width of the teeth 14t of the inner stator 14. In addition, each of the first yoke portions 15a has a radial length Wb.

On the other hand, each of the second yoke portions 15d has a constant radial width Wd. The radial width Wd is set to be less than the radial length Wb of the first yoke portions 15a (i.e., Wd<Wb). In other words, the second yoke portions 15d have a smaller cross-sectional area perpendicular to the circumferential direction of the rotor 15 than the first yoke portions 15a.

In the present embodiment, the first yoke portions 15a and the second yoke portions 15d are integrally formed into one piece (i.e., the rotor core). However, the first yoke portions 15a may alternatively be formed separately from the second yoke portions 15d and then assembled with the second yoke portions 15d into the rotor core.

Moreover, in the present embodiment, the rotor core is formed of a plurality of magnetic steel sheets 15e as shown in FIG. 3. The magnetic steel sheets 15e are laminated in the axial direction of the rotor 15 (i.e., the axial direction of the annular rotor core) as shown in FIG. 4. However, the rotor core may alternatively be formed of a single piece of a magnetic material.

Referring back to FIG. 2, for each of the second yoke portions 15d, an outer permanent magnet M1 is arranged on and fixed to a radially outer surface 15o of the second yoke portion 15d; and an inner permanent magnet M2 is arranged on and fixed to a radially inner surface 15i of the second yoke portion 15d. The number of the outer permanent magnets M1 and the number of the inner permanent magnets M2 provided in the rotor 15 may be suitably set according to, for example, the number of magnetic pole pairs corresponding to the number of phases. Moreover, each of the outer and inner permanent magnets M1 and M2 may be either formed as a single piece or divided into a plurality of permanent magnet segments.

In the present embodiment, each of the outer permanent magnets M1 is comprised of a pair of permanent magnet segments M1a and M1b, which are shown in FIG. 2 with different hatch lines for distinction. On the other hand, each of the inner permanent magnets M2 is formed as a single piece.

Moreover, in the present embodiment, for each of the second yoke portions 15d, the outer and inner permanent magnets M1 and M2 fixed to the second yoke portion 15d are magnetized toward the same side in a radial direction of the rotor 15. For example, as indicated with bold arrows in FIG. 2, the outer and inner permanent magnets M1 and M2 fixed to the center second yoke portion 15d are magnetized radially outward (i.e., upward in FIG. 2); and the outer and inner permanent magnets M1 and M2 fixed to the left and right second yoke portion 15d are magnetized radially inward (i.e., downward in FIG. 2).

For each circumferentially-adjacent pair of the first yoke portions 15a, there is provided a bridge portion 15b that bridges (or connects) radially outer end parts 15ae of the first yoke portions 15a. The bridge portion 15b covers, either partially or completely, the outer permanent magnet M1 (i.e., the permanent magnet segments M1a and M1b) interposed between the first yoke portions 15a. In addition, it is preferable to form the bridge portion 15b so as to smoothly connect the radially outer end parts 15ae of the first yoke portions 15a without causing irregularities in the radially outer surface of the annular rotor core.

By forming in the rotor core the bridge portions 15b that can constitute part of a magnetic circuit, the gap G between the outer stator 13 and the rotor 15 is reduced, thereby making it easier for magnetic flux to flow across the gap G. In addition, in terms of facilitating the flow of magnetic flux, it is preferable for the radial thickness of the bridge portions 15b to be small. On the other hand, in terms of securing the rigidity of the bridge portions 15b, it is preferable for the radial thickness of the bridge portions 15b to be large. Therefore, the radial thickness of the bridge portions 15b may be preferably set by taking both the above factors into consideration.

Moreover, in the present embodiment, between each radially-aligned pair of the bridge portions 15b and the second yoke portions 15d, there is provided a separation portion 15c that radially extends so as to separate the permanent magnet segments M1a and M1b fixed to the radially outer surface of the second yoke portion 15d from each other. In addition, the separation portion 15c and the bridge portion 15b together form a substantially T-shape.

FIG. 3 shows the configuration of the magnetic steel sheets 15e that are laminated to form the rotor core of the rotor 15. As seen from the figure, the first yoke portions 15a, the bridge portions 15b, the separation portions 15c and the second yoke portions 15d of the rotor core together define magnet-receiving holes Ha and Hb in the rotor core. More specifically, each of the magnet-receiving holes Ha and Hb is defined so as to be surrounded by one first yoke portion 15a, one bridge portion 15b, one separation portion 15c and one second yoke portion 15d that are connected with one another. Moreover, each of the magnet-receiving holes Ha is formed to receive the permanent magnet segment M1a of one of the outer permanent magnets M1; each of the magnet-receiving holes Hb is formed to receive the permanent magnet segment M1b of one of the outer permanent magnets M1 (see FIG. 2).

In addition, in the present embodiment, each of the magnet-receiving holes Ha and Hb is formed as a through hole that penetrates the rotor core in the axial direction. However, each of the magnet-receiving holes Ha and Hb may alternatively be formed as a non-through hole suitable for receiving the permanent magnet segment M1a or M1b.

Furthermore, as seen from FIG. 3, the first yoke portions 15a and the second yoke portions 15d of the rotor core together define magnet-receiving recesses Hc in the rotor core. More specifically, each of the magnet-receiving recesses Hc is defined by two first yoke portions 15a and one second yoke portion 15d connecting the two first yoke portions 15a. Each of the magnet-receiving recesses Hc is formed to receive one of the inner permanent magnets M2 (see FIG. 2).

Referring now to FIG. 5, the stator core of the outer stator 13 has a plurality of teeth 13t and a plurality of slots 13s. The teeth 13t each radially extend and are circumferentially spaced at a predetermined pitch. Each of the slots 13s is formed between one circumferentially-adjacent pair of the teeth 13t. The first multi-phase coil 13a is wound on the teeth 13t so as to be received in the slots 13s. Similarly, the stator core of the inner stator 14 has a plurality of teeth 14t and a plurality of slots 14s. The teeth 14t each radially extend and are circumferentially spaced at predetermined pitch. Each of the slots 14s is formed between one circumferentially-adjacent pair of the teeth 14t. The second multi-phase coil 14a is wound on the teeth 14t so as to be received in the slots 14s.

In operation, when electric current is supplied to flow in the first and second multi-phase coils 13a and 14a in directions indicated by the symbols ⊙ and ⊗ in FIG. 5, a plurality of magnetic poles 13p will be formed by the outer stator 13 and a plurality of magnetic poles 14p will be formed by the inner stator 14. For the sake of simplicity, FIG. 5 shows only one of the magnetic poles 13p and only one of the magnetic poles 14p. Moreover, the directions of magnetic fields generated in the outer and inner stators 13 and 14 (or the directions of electromagnets formed by the outer and inner stators 13 and 14) are also indicated by hollow arrows in FIG. 5.

The magnetic pole 13p shown in FIG. 5 has an S (or south) polarity on the radially inner periphery of the outer stator 13 facing the rotor 15. On the other hand, the magnetic pole 14p shown in FIG. 5 has an N (north) polarity on the radially outer periphery of the inner stator 14 facing the rotor 15. Moreover, the magnetic pole 13p and the magnetic pole 14p are formed at the same circumferential position (or the same angular position). That is, the outer and inner stators 13 and 14 are configured so that the magnetic pole 13p formed by the outer stator 13 is formed at the same circumferential position as and has an opposite polarity to the magnetic pole 14p formed by the inner stator 14.

The polarities of the magnetic poles 13p formed by the outer stator 13 alternate between N and S in the circumferential direction in a magnetic pole range MP (e.g., 180° in electrical angle) basis. The polarities of the magnetic poles 14p formed by the inner stator 14 also alternate between N and S in the circumferential direction in the magnetic pole range MP basis. Moreover, the magnetization directions of the permanent magnet segments M1a and M1b of the outer permanent magnet M1 and the magnetization directions of the inner permanent magnets M2 are indicated with bold arrows in FIG. 5.

The first and second multi-phase coils 13a and 14a may be formed of any suitable electric conductor wires. As shown in FIG. 5, in the present embodiment, the first and second multi-phase coils 13a and 14a are formed of electric conductor wires having a square cross section. However, the first and second multi-phase coils 13a and 14a may alternatively be formed of electric conductor wires having a rectangular cross section, a circular cross section or an elliptical cross section. In addition, the first and second multi-phase coils 13a and 14a may also be formed of litz wires each consisting of a plurality of thin wire strands.

The inventors of the present invention conducted an experiment in which the torque of the rotating electric machine 10A was measured varying the values of various parameters. Those parameters included: the circumferential width Wa (or the circumferential width Wc) of the first yoke portions 15a of the rotor core (see FIG. 2); the radial width Wd of the second yoke portions 15d of the rotor core (see FIG. 2); the magnet quantity (i.e., the total magnet mass or total magnet volume) used for the outer permanent magnets M1 (i.e., the permanent magnet segments M1a and M1b) and the inner permanent magnets M2; and the circumferential width Wt of the teeth 13t of the outer stator 13 (see FIG. 5).

Figure 6:
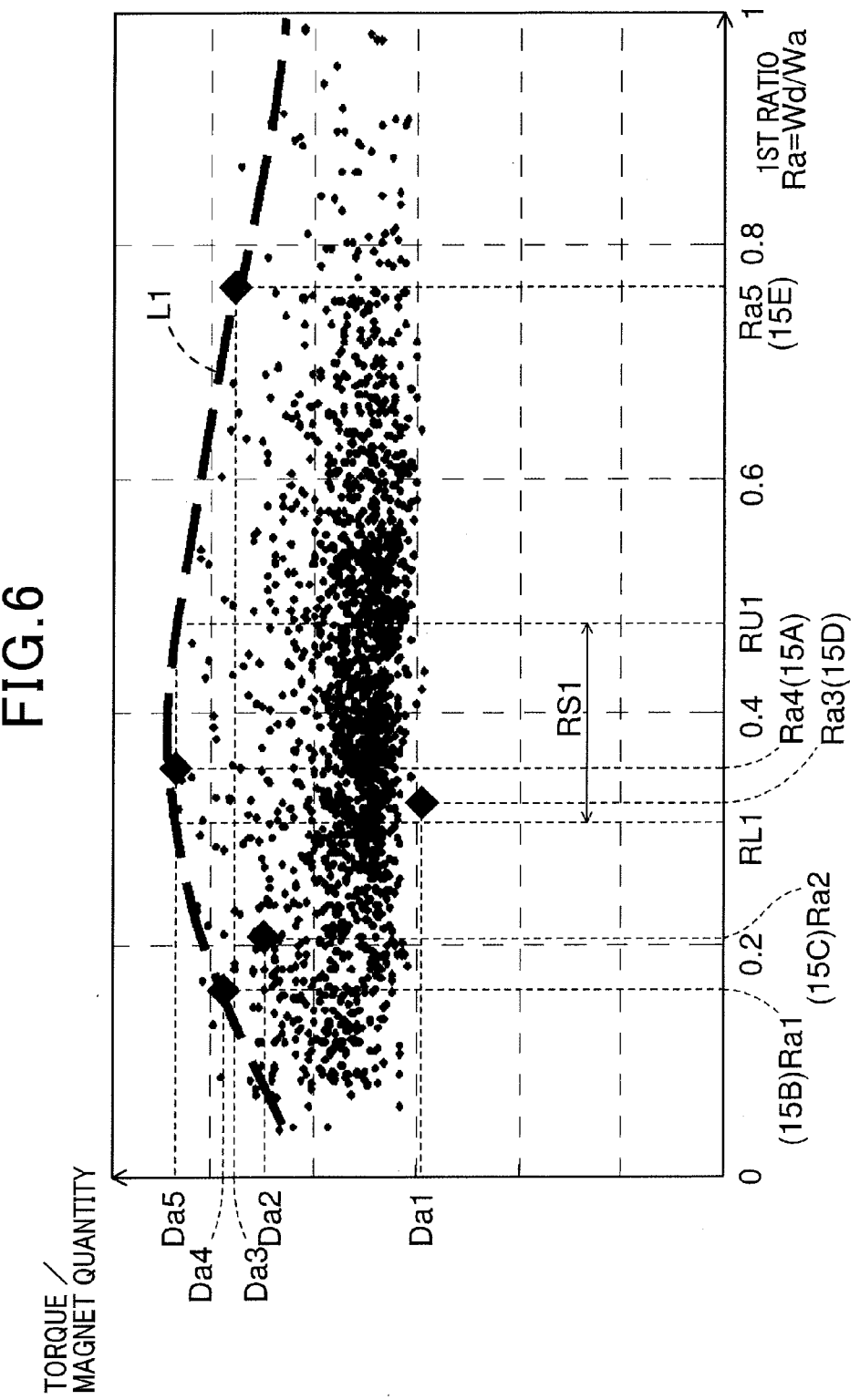
FIG. 6 is a graph illustrating the relationship between a first ratio Ra and the ratio of torque/magnet quantity.

The measurement results are shown in FIGS. 6-8.

In FIG. 6, the horizontal axis indicates a first ratio Ra, i.e., the ratio of the radial width Wd to the circumferential width Wa; and the vertical axis indicates the ratio of torque/magnet quantity, i.e., the ratio of the torque outputted from the rotating electric machine 10A to the magnet quantity used for the outer permanent magnets M1 and the inner permanent magnets M2. Moreover, in FIG. 6, all the measurement points are designated by either the symbol ♦ or the symbol ●; among them, those measurement points which are designated by the symbol ♦ represent first to sixth models of the rotating electric machine 10A which will be described later. Furthermore, in FIG. 6, a characteristic line L1, which represents the maximum values of the torque obtained at the given values of the radial width Wd, the circumferential width Wa and the magnet quantity, is shown with a bold dashed line. That is, setting the radial width Wd, the circumferential width Wa and the magnet quantity to the respective values corresponding to the characteristic line L1, it is possible to keep the torque maximum over a wide range of the first ratio Ra.

In addition, the measurement results obtained by varying the circumferential width Wc were similar to those obtained by varying the circumferential width Wa. Therefore, a description of the measurement results obtained by varying the circumferential width Wc will be omitted hereinafter.

In FIG. 7, the horizontal axis indicates a second ratio Rb, i.e., the ratio of the radial width Wd to the circumferential width Wt; and the vertical axis indicates the ratio of torque/magnet quantity. Moreover, in FIG. 7, all the measurement points are also designated by either the symbol ♦ or the symbol ● as in FIG. 6. Furthermore, in FIG. 7, a characteristic line L2, which represents the maximum values of the torque obtained at the given values of the radial width Wd, the circumferential width Wt and the magnet quantity, is shown with a bold dashed line. That is, setting the radial width Wd, the circumferential width Wt and the magnet quantity to the respective values corresponding to the characteristic line L2, it is possible to keep the torque maximum over a wide range of the second ratio Rb.

In FIG. 8, the horizontal axis indicates a third ratio Rc, i.e., the ratio of the circumferential width Wa to the circumferential width Wt; and the vertical axis indicates the ratio of torque/magnet quantity. Moreover, in FIG. 8, all the measurement points are also designated by either the symbol ♦ or the symbol ● as in FIGS. 6-7.

Next, the six models of the rotating electric machine 10A, which are represented by the measurement points designated by the symbol 1 in FIGS. 6-8, will be described with reference to FIGS. 9-20.

In each of the six models, the diameter of the outer stator 13 was equal to 290 mm; the axial length of the outer stator 13 was equal to 50 mm; and both the number of the magnetic poles 13p formed by the outer stator 13 upon energization and the number of the magnetic poles 14p formed by the inner stator 14 upon energization were equal to 20.

In FIGS. 9-20, for the sake of distinction, the outer stators of the six models are respectively designated by 13A-13F; the inner stators of the six models are respectively designated by 14A-14F; and the rotors of the six models are respectively designated by 15A-15F. Moreover, the first ratio is selectively designated by Ra1-Ra5; the second ratio is selectively designated by Rb1-Rb4; and the third ratio is selectively designated by Rc1-Rc5.

In FIGS. 10, 12, 14, 16, 18 and 20, the flow of magnetic flux φ is shown in the form of contour lines. A1 designates q-axis magnetic flux regions where there flowed q-axis magnetic flux whose circumferential component was greater than the radial component and where there was generated reluctance torque. On the other hand, A2 designates d-axis magnetic flux regions where there flowed d-axis magnetic flux whose radial component was greater than circumferential component and where there was generated magnet torque. In addition, with the q-axis magnetic flux regions A1 and the d-axis magnetic flux regions A2, it was possible to prevent that all magnetic flux φ serially passes through the outer stator 13 and the inner stator 14.

(First Model)

Figure 9:
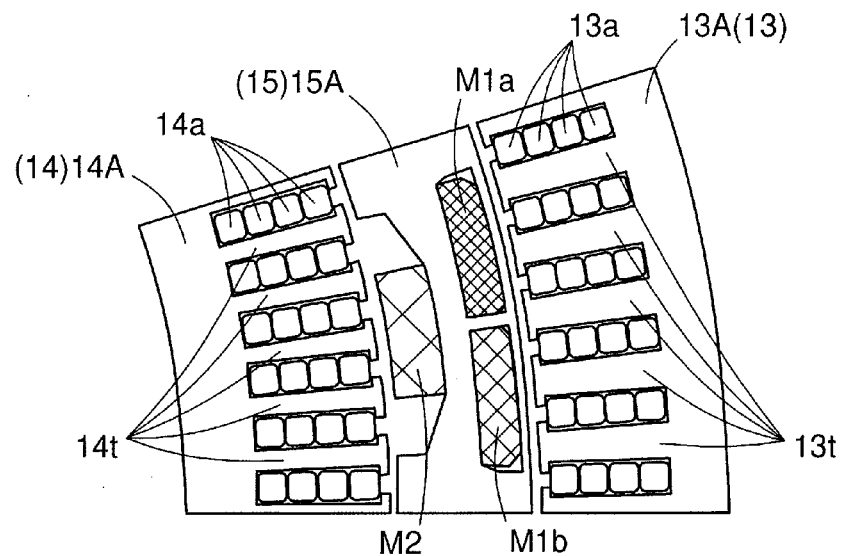
FIG. 9 is a schematic view illustrating a first configuration example of the rotor.
Figure 10:
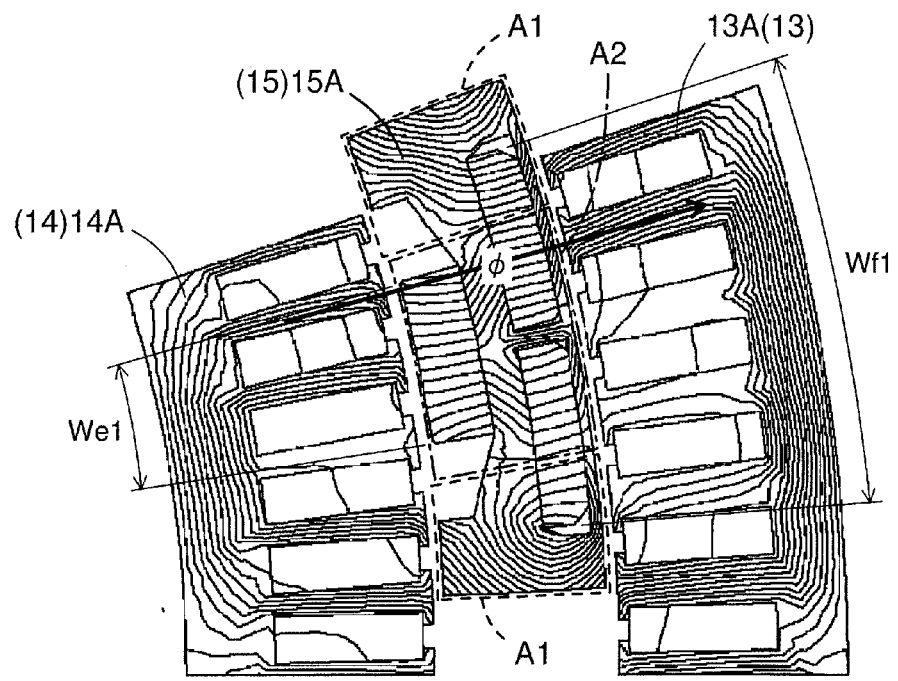
FIG. 10 is a schematic view illustrating the flow of magnetic flux in the first configuration example.

FIG. 9 illustrates the configuration of the first model of the rotating electric machine 10A. FIG. 10 illustrates the flow of magnetic flux φ in the first model.

In the first model, the first ratio Ra4 (i.e., Wd/Wa) was equal to 0.36. The second ratio Rb2 (i.e., Wd/Wt) was equal to 0.95. The third ratio Rc3 (i.e., Wa/Wt) was equal to 2.6. The magnet quantity was 8.1 cc/pole. The measured torque of the first model was 437.3 Nm. The ratio of torque/magnet quantity was 0.053.

The ratio of torque/magnet quantity of the first model is designated by Da5 in FIG. 6, by Db4 in FIG. 7, and by Dc5 in FIG. 8.

As seen from FIG. 10, in the first model, there was generated magnetic flux φ that flowed radially outward from the inner stator 14A to the outer stator 13A via the rotor 15A. Moreover, in the rotor 15A, the flow of magnetic flux φ generated in the q-axis magnetic flux regions A1 (e.g., the upper and lower end regions enclosed with dashed lines in FIG. 10) was different from that of magnetic flux φ generated in the d-axis magnetic flux regions A2 (e.g., the central region enclosed with a chain line in FIG. 10).

(Second Model)

Figure 11:
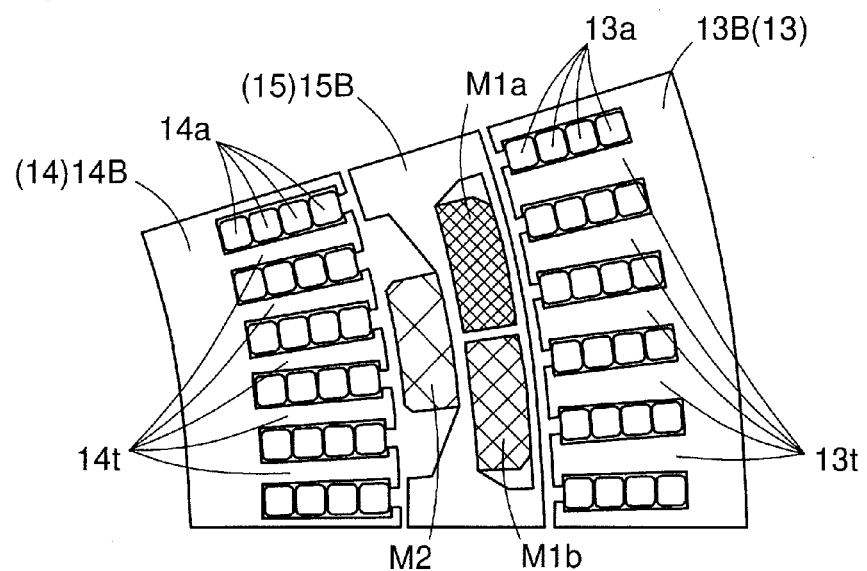
FIG. 11 is a schematic view illustrating a second configuration example of the rotor.
Figure 12:
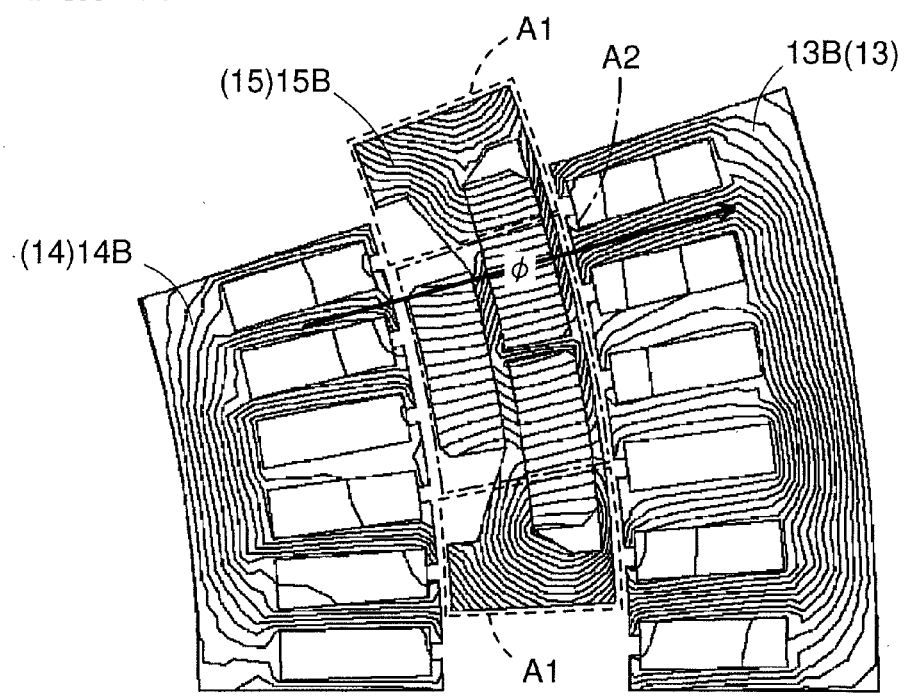
FIG. 12 is a schematic view illustrating the flow of magnetic flux in the second configuration example.

FIG. 11 illustrates the configuration of the second model of the rotating electric machine 10A. FIG. 12 illustrates the flow of magnetic flux φ in the second model.

In the second model, the first ratio Ra1 (i.e., Wd/Wa) was equal to 0.17. The second ratio Rb1 (i.e., Wd/Wt) was equal to 0.45. The third ratio Rc3 (i.e., Wa/Wt) was equal to 2.6. The magnet quantity was 9.6 cc/pole. The measured torque of the second model was 468.4 Nm. The ratio of torque/magnet quantity was 0.048.

The ratio of torque/magnet quantity of the second model is designated by Da4 in FIG. 6, by Db3 in FIG. 7, and by Dc4 in FIG. 8.

As seen from FIG. 12, in the second model, there was generated magnetic flux φ that flowed radially outward from the inner stator 14B to the outer stator 13B via the rotor 15B. Moreover, in the rotor 15B, the flow of magnetic flux φ generated in the q-axis magnetic flux regions A1 (e.g., the upper and lower end regions enclosed with dashed lines in FIG. 12) was different from that of magnetic flux φ generated in the d-axis magnetic flux regions A2 (e.g., the central region enclosed with a chain line in FIG. 12).

(Third Model)

Figure 13:
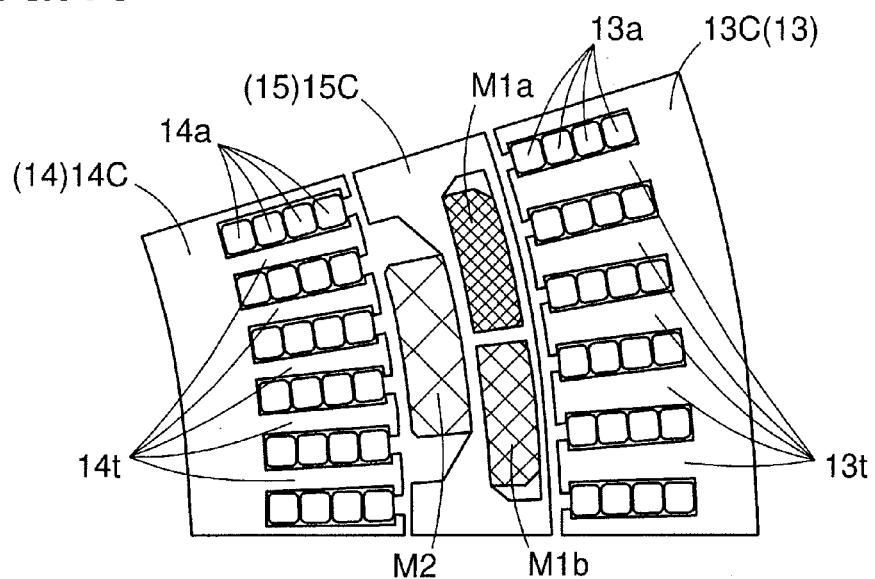
FIG. 13 is a schematic view illustrating a third configuration example of the rotor.
Figure 14:
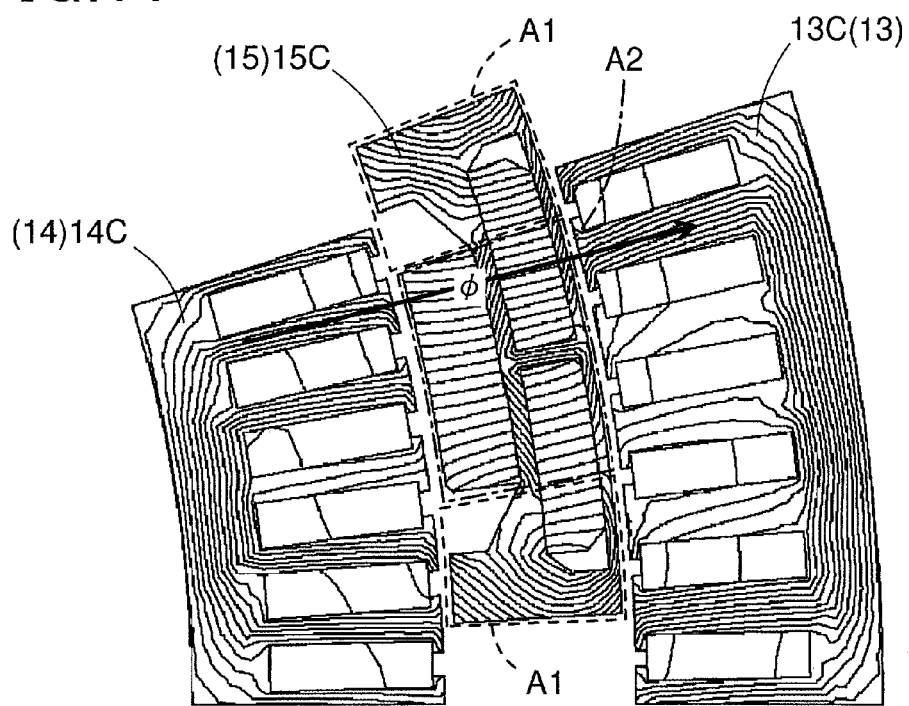
FIG. 14 is a schematic view illustrating the flow of magnetic flux in the third configuration example.

FIG. 13 illustrates the configuration of the third model of the rotating electric machine 10A. FIG. 14 illustrates the flow of magnetic flux φ in the third model.

In the third model, the first ratio Ra2 (i.e., Wd/Wa) was equal to 0.2. The second ratio Rb1 (i.e., Wd/Wt) was equal to 0.3. The magnet quantity was 12.6 cc/pole. The measured torque of the third model was 483.9 Nm. The ratio of torque/magnet quantity was 0.045.

The ratio of torque/magnet quantity of the third model is designated by Da2 in FIG. 6.

As seen from FIG. 14, in the third model, there was generated magnetic flux φ that flowed radially outward from the inner stator 14C to the outer stator 13C via the rotor 15C. Moreover, in the rotor 15C, the flow of magnetic flux φ generated in the q-axis magnetic flux regions A1 (e.g., the upper and lower end regions enclosed with dashed lines in FIG. 14) was different from that of magnetic flux φ generated in the d-axis magnetic flux regions A2 (e.g., the central region enclosed with a chain line in FIG. 14).

(Fourth Model)

Figure 15:
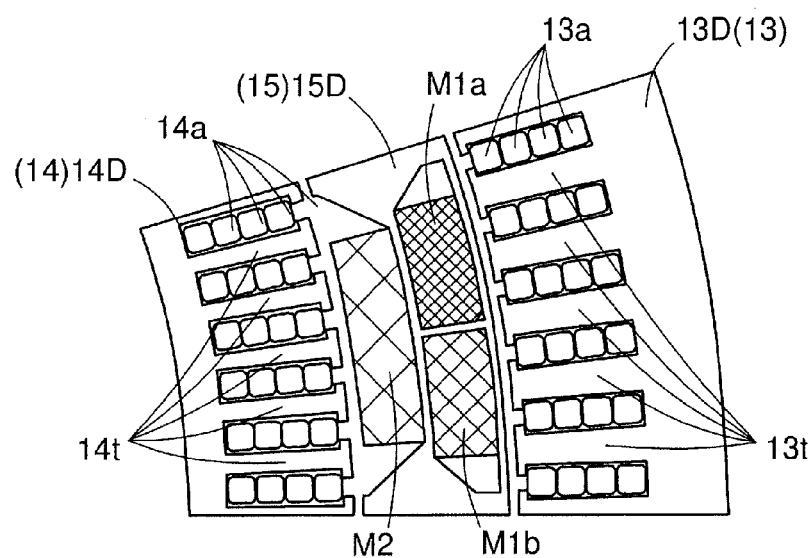
FIG. 15 is a schematic view illustrating a fourth configuration example of the rotor.
Figure 16:
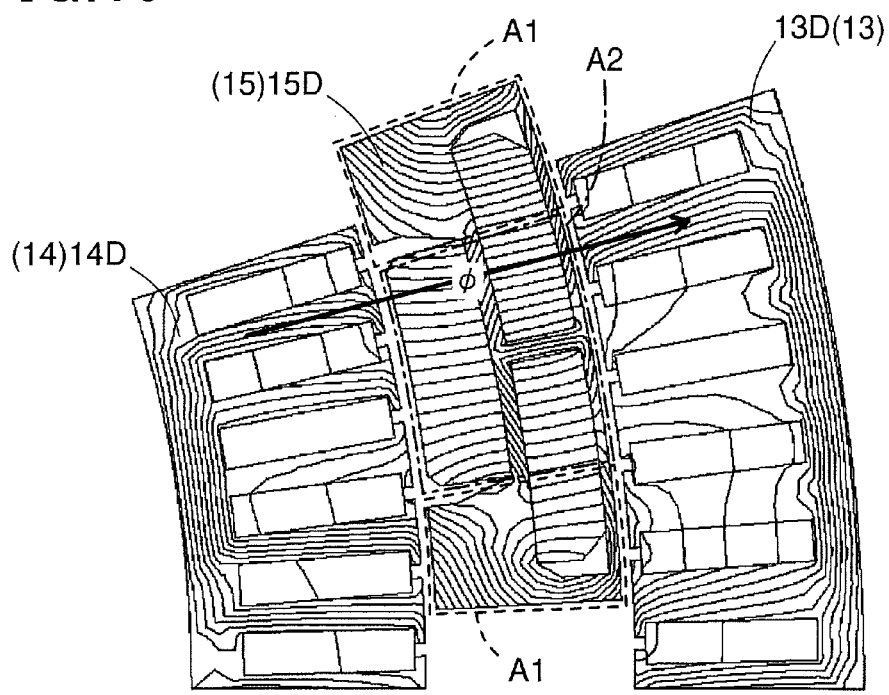
FIG. 16 is a schematic view illustrating the flow of magnetic flux in the fourth configuration example.

FIG. 15 illustrates the configuration of the fourth model of the rotating electric machine 10A. FIG. 16 illustrates the flow of magnetic flux φ in the fourth model.

In the fourth model, the first ratio Ra3 (i.e., Wd/Wa) was equal to 0.34. The second ratio Rb3 (i.e., Wd/Wt) was equal to 0.38. The third ratio Rc1 (i.e., Wa/Wt) was equal to 1.05. The magnet quantity was 13.7 cc/pole. The measured torque of the fourth model was 406.9 Nm. The ratio of torque/magnet quantity was 0.03.

The ratio of torque/magnet quantity of the fourth model is designated by Da1 in FIG. 6, and by Dc1 in FIG. 8.

As seen from FIG. 16, in the fourth model, there was generated magnetic flux φ that flowed radially outward from the inner stator 14D to the outer stator 13D via the rotor 15D. Moreover, in the rotor 15D, the flow of magnetic flux φ generated in the q-axis magnetic flux regions A1 (e.g., the upper and lower end regions enclosed with dashed lines in FIG. 16) was different from that of magnetic flux φ generated in the d-axis magnetic flux regions A2 (e.g., the central region enclosed with a chain line in FIG. 16).

(Fifth Model)

Figure 17:
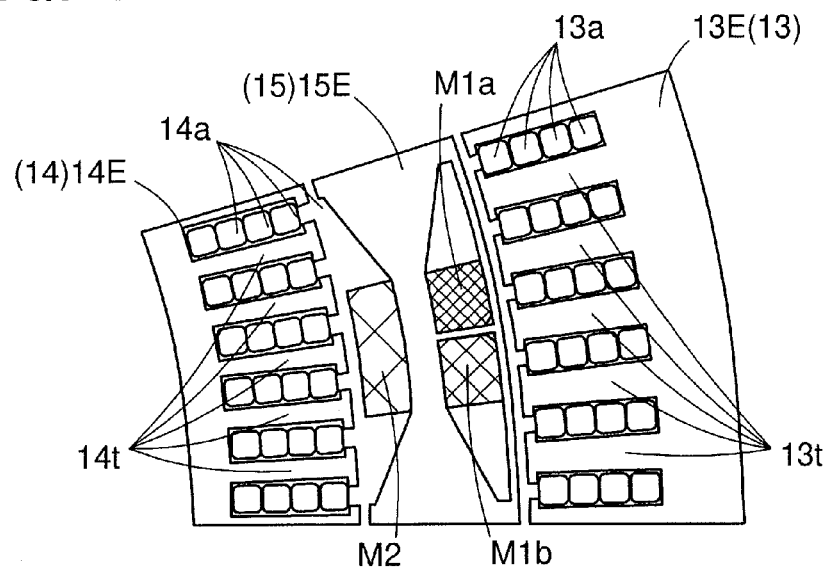
FIG. 17 is a schematic view illustrating a fifth configuration example of the rotor.
Figure 18:
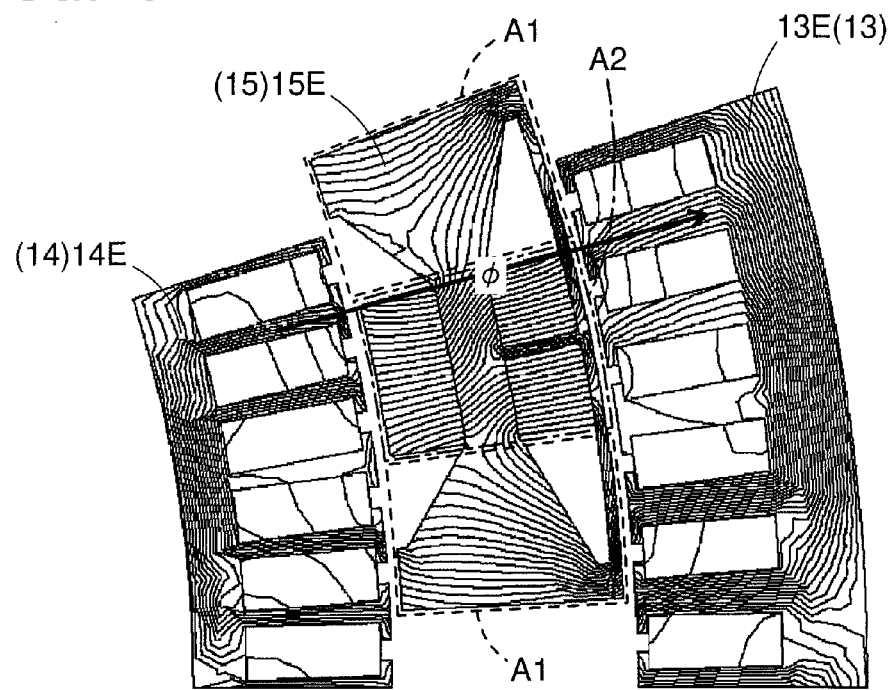
FIG. 18 is a schematic view illustrating the flow of magnetic flux in the fifth configuration example.

FIG. 17 illustrates the configuration of the fifth model of the rotating electric machine 10A. FIG. 18 illustrates the flow of magnetic flux φ in the fifth model.

In the fifth model, the first ratio Ra5 (i.e., Wd/Wa) was equal to 0.77. The second ratio Rb4 (i.e., Wd/Wt) was equal to 1.5. The third ratio Rc2 (i.e., Wa/Wt) was equal to 1.9. The magnet quantity was 6.9 cc/pole. The measured torque of the fifth model was 330.4 Nm. The ratio of torque/magnet quantity was 0.047.

The ratio of torque/magnet quantity of the fifth model is designated by Da3 in FIG. 6, by Db2 in FIG. 7, and by Dc3 in FIG. 8.

As seen from FIG. 18, in the fifth model, there was generated magnetic flux φ that flowed radially outward from the inner stator 14E to the outer stator 13E via the rotor 15E. Moreover, in the rotor 15E, the flow of magnetic flux φ generated in the q-axis magnetic flux regions A1 (e.g., the upper and lower end regions enclosed with dashed lines in FIG. 18) was different from that of magnetic flux φ generated in the d-axis magnetic flux regions A2 (e.g., the central region enclosed with a chain line in FIG. 18).

(Sixth Model)

Figure 19:
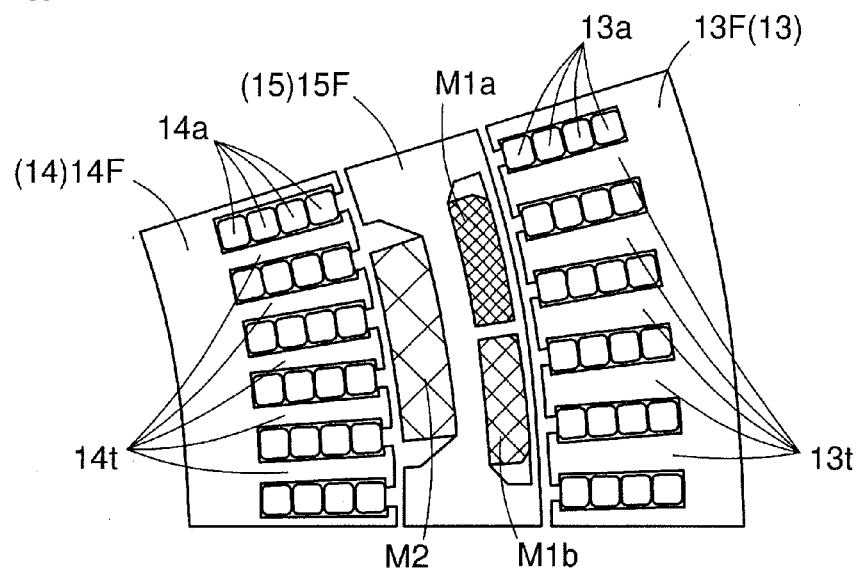
FIG. 19 is a schematic view illustrating a sixth configuration example of the rotor.
Figure 20:
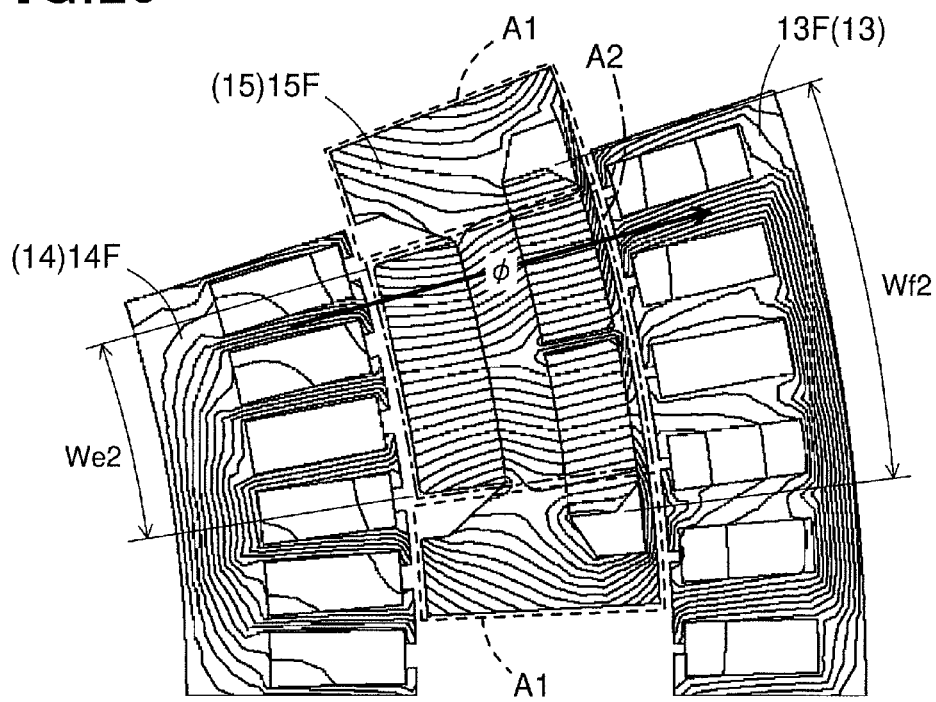
FIG. 20 is a schematic view illustrating the flow of magnetic flux in the sixth configuration example.

FIG. 19 illustrates the configuration of the sixth model of the rotating electric machine 10A. FIG. 20 illustrates the flow of magnetic flux φ in the sixth model.

In the sixth model, the first ratio Ra5 (i.e., Wd/Wa) was equal to 0.6. The second ratio Rb4 (i.e., Wd/Wt) was equal to 1.6. The third ratio Rc4 (i.e., Wa/Wt) was equal to 2.6. The magnet quantity was 12.3 cc/pole. The measured torque of the sixth model was 393.5 Nm. The ratio of torque/magnet quantity was 0.031.

The ratio of torque/magnet quantity of the sixth model is designated by Dc2 in FIG. 8.

As seen from FIG. 20, in the sixth model, there was generated magnetic flux φ that flowed radially outward from the inner stator 14F to the outer stator 13F via the rotor 15F. Moreover, in the rotor 15F, the flow of magnetic flux φ generated in the q-axis magnetic flux regions A1 (e.g., the upper and lower end regions enclosed with dashed lines in FIG. 20) was different from that of magnetic flux φ generated in the d-axis magnetic flux regions A2 (e.g., the central region enclosed with a chain line in FIG. 20).

Next, three examples will be described of optimally setting the circumferential width Wa, the radial width Wd, the magnet quantity and the circumferential width Wt in the rotating electric machine 10A in consideration of the above-described measurement results of the six models.

First Setting Example

According to the characteristic line L1 shown in FIG. 6, the ratio of torque/magnet quantity is highest in the vicinity of Ra=0.4. That is, if the radial width Wd of the second yoke portions 15d of the rotor core is too small or too large, it is impossible to secure a high torque of the rotating electric machine 10A. Moreover, as seen from FIG. 6, both Da4 and Da3 were lower than Da5. As described previously, Da4 designates the ratio of torque/magnet quantity of the second model; Da3 designates the ratio of torque/magnet quantity of the fifth model; and Da5 designates the ratio of torque/magnet quantity of the first model. Accordingly, it is preferable to: set a threshold ratio to Da5; and then set the radial width Wd within a range (i.e., the range RS1 from the lower limit RL1 to the upper limit RU1 in FIG. 6) in which the ratio of torque/magnet quantity is higher than or equal to the threshold ratio (i.e., Da5).

Second Setting Example

According to the characteristic line L2 shown in FIG. 7, the ratio of torque/magnet quantity is highest in the vicinity of Rb=1. That is, if the difference between the radial width Wd of the second yoke portions 15d of the rotor core and the circumferential width Wt of the teeth 13t of the outer stator 13 is large, it is impossible to secure a high torque of the rotating electric machine 10A. Moreover, as seen from FIG. 7, both Db3 and Db2 were lower than Db4. As described previously, Db3 designates the ratio of torque/magnet quantity of the second model; Db2 designates the ratio of torque/magnet quantity of the fifth model; and Db4 designates the ratio of torque/magnet quantity of the first model. Accordingly, it is preferable to: set a threshold ratio Dbth to be, for example, slightly lower than Db4; and then set the radial width Wd and the circumferential width Wt within a range (i.e., the range RS2 from the lower limit RL2 to the upper limit RU2 in FIG. 7) in which the ratio of torque/magnet quantity is higher than or equal to the threshold ratio Dbth.

Third Setting Example

As seen from FIG. 8, Rc5, Rc3 and Rc4 were about the same (i.e., about 2.6). As described previously, Rc5 designates the third ratio Rc of the first model; Rc3 designates the third ratio Rc of the second model; and Rc4 designates the third ratio Rc of the sixth model. Moreover, Dc5 (i.e., the ratio of torque/magnet quantity of the first model) was 0.053; Dc4 (i.e., the ratio of torque/magnet quantity of the second model) was 0.048; and Dc2 (i.e., the ratio of torque/magnet quantity of the sixth model) was 0.031. That is, the ratio of torque/magnet quantity of the first model was considerably higher than that of the sixth model. In view of the above, a comparison will be made hereinafter between the rotor 15A of the first model and the rotor 15F of the sixth model.

As shown in FIGS. 9-10, in the rotor 15A of the first model, each of the outer permanent magnets M1 (i.e., M1a+M1b) had a circumferential width Wf1; and each of the inner permanent magnets M2 had a circumferential width We1. Moreover, the ratio of We1/Wf1 was 0.45.

On the other hand, as shown in FIGS. 19-20, in the rotor 15F of the sixth model, each of the outer permanent magnets M1 (i.e., M1a+M1b) had a circumferential width Wf2; and each of the inner permanent magnets M2 had a circumferential width We2. Moreover, the ratio of We2/Wf2 was 0.75.

Furthermore, in the experiment, the torque of the rotating electric machine 10A was also measured varying the ratio of the circumferential width We of the inner permanent magnets M2 to the circumferential width Wf of the outer permanent magnets M1 (i.e., We/Wf). As a result, it has been made clear that the ratio of torque/magnet quantity increased with decrease in the ratio of We/Wf.

In addition, it can be seen from FIGS. 10 and 20 that more magnetic flux φ flowed in the q-axis magnetic flux regions A1 in the first model than in the sixth model. Consequently, the first model could generate more reluctance torque than the sixth model.

In view of the above, it is preferable to set the number of the inner permanent magnets M2 to be less than the number of the outer permanent magnets M1 and/or set the circumferential width We of the inner permanent magnets M2 to be smaller than the circumferential width Wf of the outer permanent magnets M1. More specifically, the ratio of We/Wf is preferably set to be lower than or equal to 0.6, and more preferably set to be lower than or equal to 0.5. On the other hand, if the circumferential width We of the inner permanent was set too small, it would become difficult for magnetic flux φ to flow in the radial direction. Therefore, the ratio of We/Wf is preferably set to be higher than or equal to 0.2, and more preferably set to be higher than or equal to 0.3.

That is, the ratio of We/Wf is preferably set to be in the range of 0.2 to 0.6, and more preferably set to be in the range of 0.3 to 0.5.

In addition, it is also preferable to set the total circumferential width (i.e., the sum of circumferential widths) of all the inner permanent magnets M2 to be smaller than that of all the outer permanent magnets M1.

Next, advantages of the double-stator rotating electric machine 10A according to the present embodiment will be descried hereinafter.

In the present embodiment, the rotating electric machine 10A includes the rotor 15, the outer stator 13 disposed radially outside the rotor 15 with the outer gap G formed therebetween, and the inner stator 14 disposed radially inside the rotor 15 with the inner gap G formed therebetween. The outer rotor 13 has the first multi-phase coil 13a wound thereon, and the inner stator 14 has the second multi-phase coil 14a wound thereon. The outer stator 13 is configured to form the magnetic poles 13p upon energization of (or supply of electric current to) the first multi-phase coil 13a. The inner stator 14 is configured to form the magnetic poles 14p upon energization of the second multi-phase coil 14a. The number of the magnetic poles 13p formed by the outer stator 13 is equal to the number of the magnetic poles 14p formed by the inner stator 14. Each of the magnetic poles 13p formed by the outer stator 13 is located at the same circumferential position as and has an opposite polarity to a corresponding one of the magnetic poles 14p formed by the inner stator 14, thereby causing magnetic flux to flow in a radial direction of the rotor 15 (see FIG. 5). The rotor 15 has the first yoke portions 15a each of which radially extends so as to form a magnetic flux passage magnetically connecting the outer and inner stators 13 and 14.

Consequently, with the first yoke portions 15a of the rotor 15 magnetically connecting the outer and inner stators 13 and 14, it is possible to secure a high reluctance torque of the rotating electric machine 10A. As a result, it is possible to increase the total torque (i.e., the sum of the magnet torque and the reluctance torque) of the rotating electric machine 10A.

Moreover, in the present embodiment, the rotor 15 further has the second yoke portions 15d each of which extends in the circumferential direction of the rotor 15 to connect an adjacent pair of the first yoke portions 15a. The second yoke portions 15d have a smaller cross-sectional area perpendicular to the circumferential direction of the rotor 15 than the first yoke portions 15a. Each of the second yoke portions 15d has the outer permanent magnet M1 (i.e., the permanent magnet segments M1a and M1b) arranged on its radially outer surface 15o and the inner permanent magnet M2 arranged on its radially inner surface 15i. The outer permanent magnet M1 and the inner permanent magnet M2 are each magnetized in the radial direction of the rotor 15.

With the above configuration, there are formed in the rotor 15 both the q-axis magnetic flux regions A1 and the d-axis magnetic flux regions A2, thereby preventing that all magnetic flux φ serially passes through the outer stator 13 and the inner stator 14 (see FIGS. 10, 12, 14, 16, 18 and 20). Moreover, the difference in size between the magnetic flux passages of the outer and inner stators 13 and 14 can be compensated with the second yoke portions 15d of the rotor 15. Consequently, it is possible secure a high output for the size, or a small size for the output of the rotating electric machine 10A.

Furthermore, in the present embodiment, for each of the second yoke portions 15d of the rotor 15, both the outer permanent magnet M1 arranged on the radially outer surface 15o of the second yoke portion 15d and the inner permanent magnet M2 arranged on the radially inner surface 15i of the second yoke portion 15d are magnetized toward the same side in the radial direction of the rotor 15 (see FIGS. 2 and 5).

Consequently, it is possible to reliably cause magnetic flux to flow in the radial direction between the outer and inner stators 13 and 14 via the rotor 15. As a result, it is possible to increase the torque of the rotating electric machine 10A.

Moreover, in the present embodiment, the ratio We/Wf of the circumferential width We of the inner permanent magnet M2 to the circumferential width Wf of the outer permanent magnet M1 is set to be in the range of 0.2 to 0.6 (see FIG. 10).

Consequently, it is possible to increase the reluctance torque, thereby increasing the total torque of the rotating electric machine 10A.

In the present embodiment, the number of all the inner permanent magnets M2 arranged on the radially inner surfaces 15i of the second yoke portions 15d is set to be less than the number of all the outer permanent magnets M1 arranged on the radially outer surfaces 15o of the second yoke portions 15d. Moreover, the total circumferential width (i.e., the sum of circumferential widths) of all the inner permanent magnets M2 is set to be smaller than that of all the outer permanent magnets M1.

Consequently, it is possible to further increase the reluctance torque, thereby further increasing the total torque of the rotating electric machine 10A. In addition, it is also possible to reduce the radial thickness of the outer permanent magnets M1 and accordingly increase the radial thickness of the bridge portions 15b of the rotor 15, thereby improve the resistance of the rotating electric machine 10A to the centrifugal force.

In the present embodiment, the outer stator 13 has the teeth 13t and the slots 13s formed therein, and the inner stator 14 has the teeth 14t and the slots 14s formed therein. The first multi-phase coil 13a is wound on the teeth 13t of the outer stator 13 so as to be received in the slots 13s of the outer stator 13. The second multi-phase coil 14a is wound on the teeth 14t of the inner stator 14 so as to be received in the slots 14s of the inner stator 14. The first yoke portions 15a of the rotor 15 have a greater circumferential width than the teeth 13t of the outer stator 13 and the teeth 14t of the inner stator 14 (see FIG. 5).

Consequently, magnetic flux φ (in particular, the magnetic flux in the q-axis magnetic flux regions A1) is allowed to smoothly flow between the rotor 15 and the outer and inner stators 13 and 14. As a result, it is possible to increase the reluctance torque, thereby increasing the total torque of the rotating electric machine 10A.

In the present embodiment, the circumferential width Wa of the first yoke portions 15a of the rotor 15 is set to be greater than the radial width Wd of the second yoke portions 15d. More specifically, the ratio of Wd/Wa (i.e., the first ratio) is set to be in the range RS1 shown in FIG. 6. In addition, the circumferential width Wc of the first yoke portions 15a is also set to be greater than the radial width Wd of the second yoke portions 15d (see FIG. 2).

Consequently, it is possible to increase the ratio of torque/magnet quantity of the rotating electric machine 10A.

In the present embodiment, the rotor 15 has the bridge portions 15b each of which extends in the circumferential direction of the rotor 15 so as to bridge the radially outer end parts 15ae of an adjacent pair of the first yoke portions 15a and cover the outer permanent magnet M1 arranged on the radially outer surface 15o of the second yoke portion 15d that connects the adjacent pair of the first yoke portions 15a (see FIGS. 2-3).

Consequently, with the bridge portions 15b, during high-speed rotation of the rotor 15, it is possible to securely retain the outer permanent magnets M1 against the centrifugal force.

In the present embodiment, the rotor core of the rotor 15 is formed by laminating the magnetic steel sheets 15e in the axial direction (see FIGS. 3-4).

Therefore, it is possible to easily set the axial length of the rotor core to a desired value by adjusting either the thickness or the number of the magnetic steel sheets 15e. Moreover, it is also possible to easily form the rotor core into a desired shape by performing a press work on the magnetic steel sheets 15e.

Second Embodiment

Figure 21:
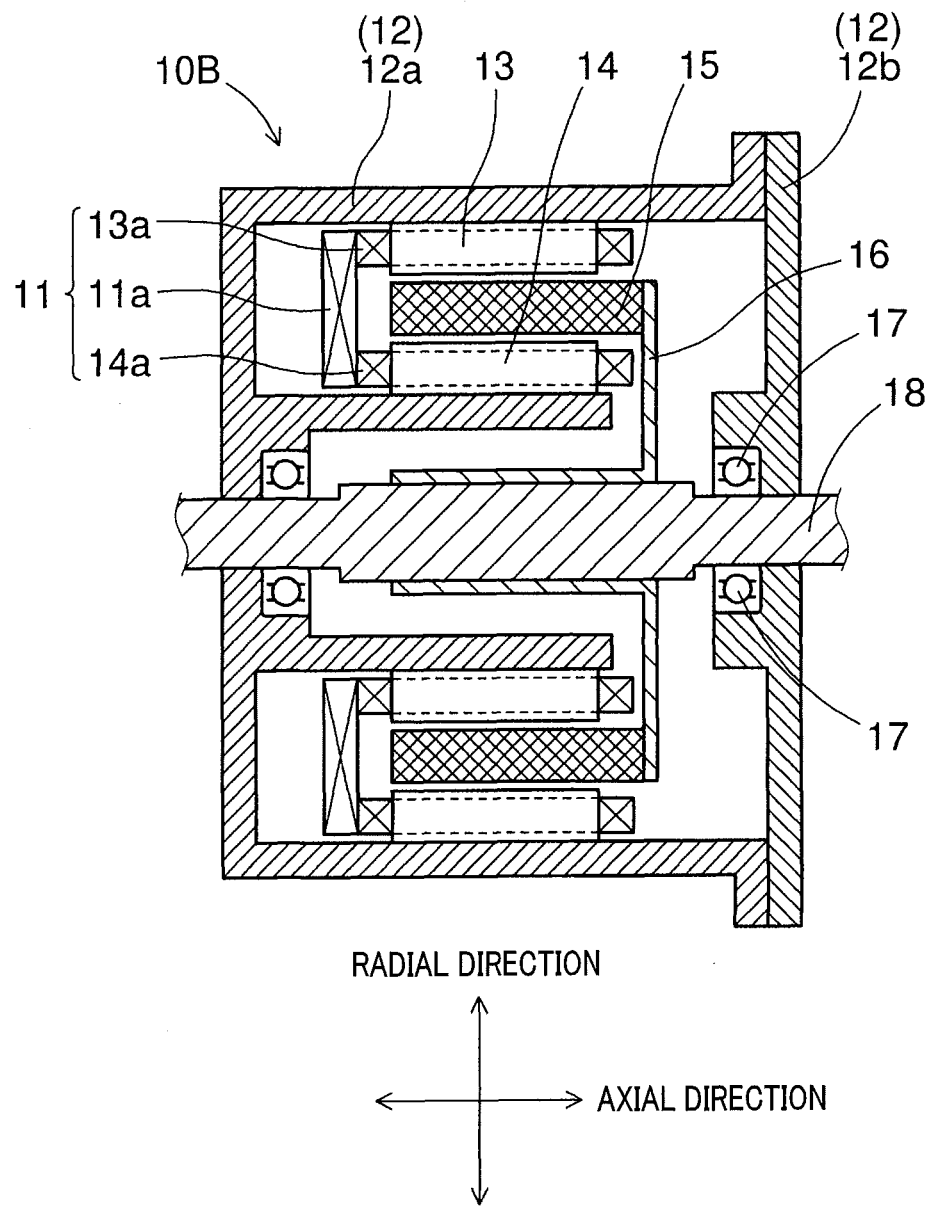
FIG. 21 is a cross-sectional view of a double-stator rotating electric machine according to a second embodiment.

FIG. 21 shows the overall configuration of a double-stator rotating electric machine 10B according to a second embodiment.

As seen from FIG. 21, the configuration of the double-stator rotating electric machine 10B according to the present embodiment is almost identical to that of the double-stator rotating electric machine 10A according to the first embodiment (see FIG. 1). Accordingly, only the differences therebetween will be described hereinafter.

In the first embodiment, the rotating electric machine 10A includes the first multi-phase coil 13a wound on the stator core of the outer stator 13 and the second multi-phase coil 14a wound on the stator core of the inner stator 14. The first multi-phase coil 13a and the second multi-phase coil 14a are separately formed from each other (see FIG. 5).

Figure 22:
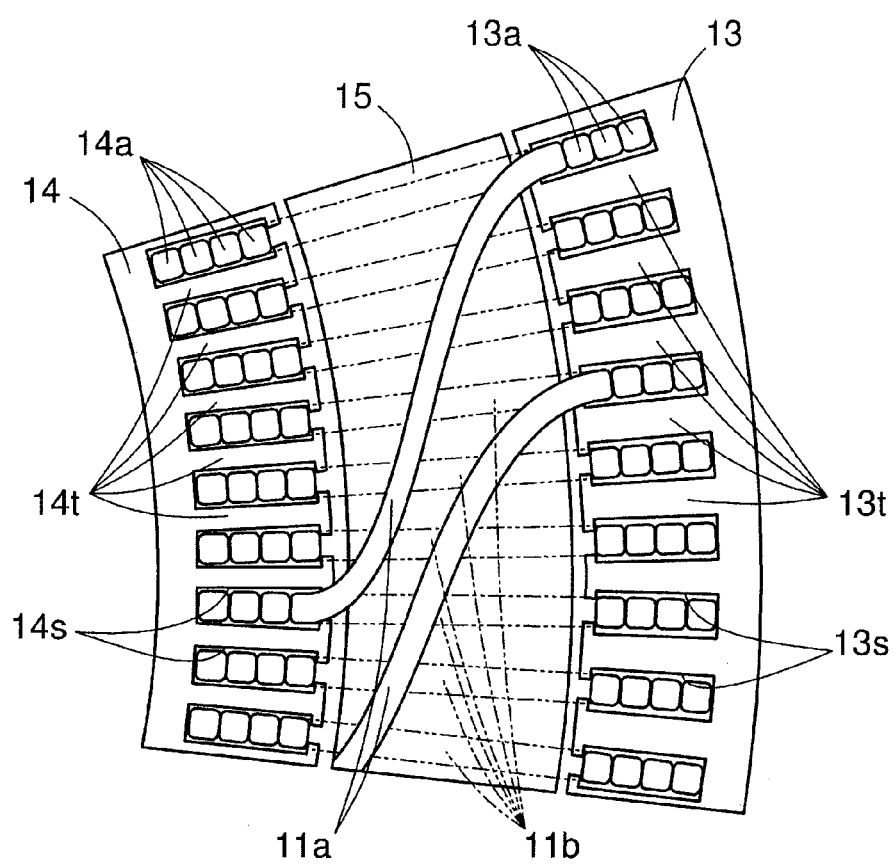
FIG. 22 is a schematic view illustrating a first configuration example of a multi-phase coil of the double-stator rotating electric machine according to the second embodiment.
Figure 23:
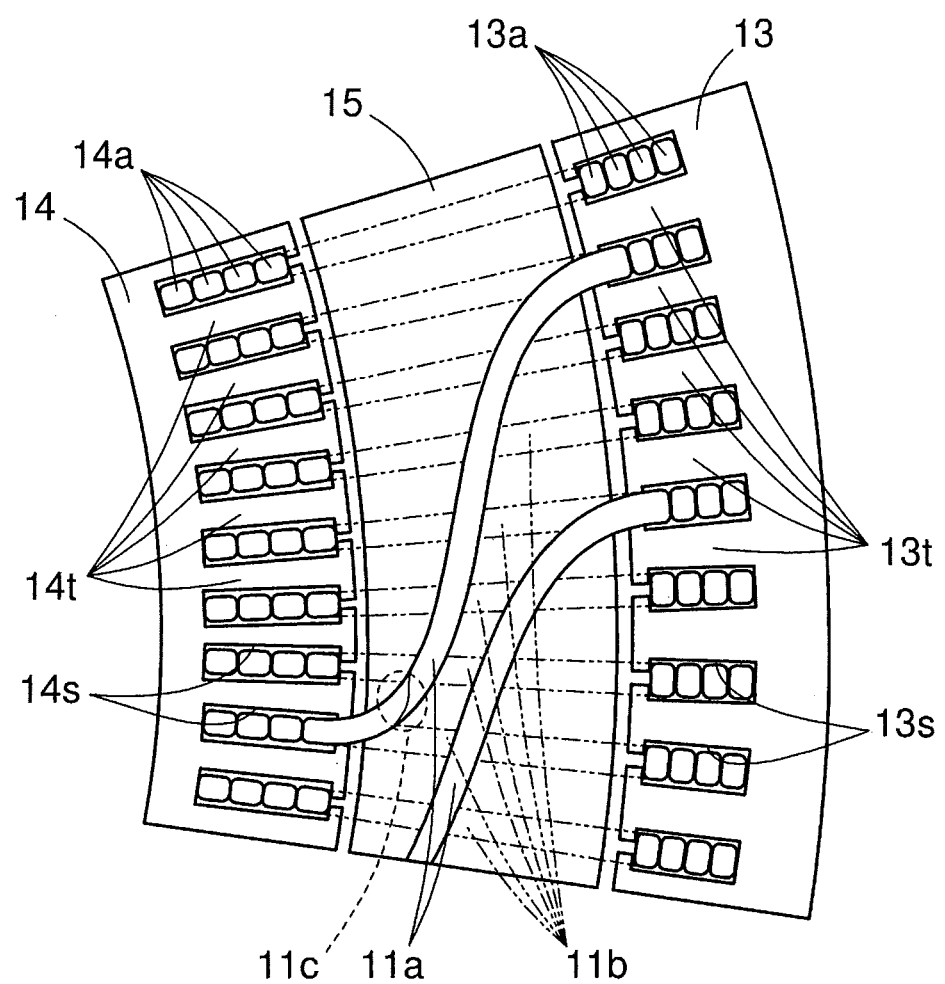
FIG. 23 is a schematic view illustrating a second configuration example of the multi-phase coil of the double-stator rotating electric machine according to the second embodiment.

In comparison, in the present embodiment, as shown in FIGS. 21-23, the rotating electric machine 10B includes a multi-phase coil 11 that is comprised of: a first multi-phase coil 13a wound on the stator core of the outer stator 13; a second multi-phase coil 14a wound on the stator core of the inner stator 14; and a plurality of bridging wires 11a that connect (or bridge) the first and second multi-phase coils 13a and 14a. In other words, in the present embodiment, the first and second multi-phase coils 13a and 14a are integrally formed into the single multi-phase coil 11 through the bridging wires 11a.

Moreover, each of phase windings of the first multi-phase coil 13a may be integrally formed with a corresponding one of phase windings of the second multi-phase coil 14a using at least one electric conductor wire. In this case, it is preferable to form each corresponding pair of phase windings of the first and second multi-phase coils 13a and 14a and the bridging wire 11a connecting the corresponding pair of phase windings using a single electric conductor wire.

Alternatively, the multi-phase coil 11 may include a plurality of U-shaped electric conductor segments each of which constitutes part of one of the phase windings of the first multi-phase coil 13a, part of one of the phase windings of the second multi-phase coil 14a and one of the bridging wires 11a. Moreover, in this case, each of the first and second multi-phase coils 13a and 14a may be formed of a plurality of U-shaped electric conductor segments.

FIG. 22 illustrates a first configuration example of the multi-phase coil 11. In this example, the multi-phase coil 11 is formed of electric conductor wires having a square cross section. Accordingly, each of the first multi-phase coil 13a, the second multi-phase coil 14a and the bridging wires 11a has a square cross section. Moreover, each of the bridging wires 11a, which are shown with bold continuous lines in FIG. 22, extends obliquely with respect to both a radial direction and the circumferential direction of the rotor 15 so as to connect a corresponding pair of one of in-slot portions of the first multi-phase coil 13a received in the slots 13s of the outer stator 13 and one of in-slot portions of the second multi-phase coil 14a received in the slots 14s of the inner stator 14. The slot 13s of the outer stator 13 and the slot 14s of the inner stator 14, in which the corresponding pair of the in-slot portions of the first and second multi-phase coils 13a and 14a connected by the bridging wire 11a are respectively received, are circumferentially offset from each other by, for example, one magnetic pole pitch (or 180° in electrical angle). Furthermore, the multi-phase coil 11 also includes a plurality of bridging wires 11b that are shown with two-dot chain lines in FIG. 22. Unlike the bridging wires 11a, each of the bridging wires 11a radially extends to connect a corresponding pair of the in-slot portions of the first and second multi-phase coils 13a and 14a. That is, the slot 13s of the outer stator 13 and the slot 14s of the inner stator 14, in which the corresponding pair of the in-slot portions of the first and second multi-phase coils 13a and 14a connected by the bridging wire 11b are respectively received, are located at the same circumferential position (or the same angular position). In addition, all of the bridging wires 11a and 11b together constitute a coil end part of the multi-phase coil 11 which protrudes from the stator cores of the outer and inner stators 13 and 14 on one axial side of the stator cores.

FIG. 23 illustrates a second configuration example of the multi-phase coil 11. In this example, the multi-phase coil 11 is formed of electric conductor wires having a rectangular cross section. Accordingly, each of the first multi-phase coil 13a, the second multi-phase coil 14a and the bridging wires 11a and 11b has a rectangular cross section. Moreover, each of the in-slot portions of the first multi-phase coil 13a is received in one of the slots 13s of the outer stator 13 so that the shorter sides of the rectangular cross section of the in-slot portion are parallel to the radial direction (or the depth direction of the slot 13s). On the other hand, each of the in-slot portions of the second multi-phase coil 14a is received in one of the slots 14s of the inner stator 14 so that the longer sides of the rectangular cross section of the in-slot portion are parallel to the radial direction (or the depth direction of the slot 14s). With the above arrangement of the in-slot portions of the first and second multi-phase coils 13a and 14a in the slots 13s and 14s of the outer and inner stators 13 and 14, it is possible to increase the sizes of the teeth 13t and 14t of the outer and inner stators 13 and 14, thereby making it easier for magnetic flux to flow through the outer and inner stators 13 and 14. In addition, in this example, in view of the difference between the orientation of the in-slot portions of the first multi-phase coil 13a in the slots 13s of the outer stator 13 and the orientation of the in-slot portions of the second multi-phase coil 14a in the slots 14s of the inner stator 14, each of the bridging wires 11a is configured to have a twisted portion 11c so as to smoothly connect a corresponding pair of the in-slot portions of the first and second multi-phase coils 13a and 14a.

The above-described rotating electric machine 10B has the same advantages as the rotating electric machine 10A according to the first embodiment.

In addition, in the present embodiment, the bridging wires 11a are configured to extend obliquely with respect to both the radial and circumferential directions of the rotor 15. With this configuration, it is possible to reduce the height of the coil end part of the multi-phase coil 11, thereby minimizing the size of the rotating electric machine 10B.

While the above particular embodiments have been shown and described, it will be understood by those skilled in the art that various modifications, changes, and improvements may be made without departing from the spirit of the present invention.

(1) In the above-described embodiments, each of the outer permanent magnets M1 is comprised of a pair of permanent magnet segments M1a and M1b; and each of the inner permanent magnets M2 is formed as a single piece (see FIGS. 2 and 5).

However, each of the outer permanent magnets M1 may also be comprised of three or more permanent magnet segments. Each of the inner permanent magnets M2 may also be comprised of two or more permanent magnet segments.

Moreover, in the case where each of the inner permanent magnets M2 is also comprised of a plurality of permanent magnet segments, it is preferable to set the number of permanent magnet segments per inner permanent magnet M2 to be less than the number of permanent magnet segments per outer permanent magnet M1. Furthermore, in this case, the rotor core may further have a plurality of separation portions each of which radially extends so as to separate a circumferentially-adjacent pair of the permanent magnet segments of the inner permanent magnets M2.

(2) In the above-described embodiments, the present invention is directed to the double-stator rotating electric machines 10A and 10B that are configured as a motor-generator. However, the present invention can also be applied to other types of double-stator rotating electric machines, such as a double-stator electric motor or a double-stator electric generator.

(3) In the above-described embodiments, the first circumferential width Wa of the first yoke portions 15a of the rotor core is set to be less than the second circumferential width Wc of the first yoke portions 15 (see FIG. 2). However, the first circumferential width Wa may also be set to be equal to the second circumferential width Wc.

(4) In the above-described embodiments, each of the magnet-receiving holes Ha and Hb is formed so as to have a larger size than the permanent magnet segment M1a or M1b received therein. In other words, each of the magnet-receiving holes Ha and Hb is formed so as to have a vacant space unoccupied by the permanent magnet segment M1a or M1b (see FIGS. 2-3).

However, each of the magnet-receiving holes Ha and Hb may also be formed so as to have the same size (within the range of manufacturing tolerances) as the permanent magnet segment M1a or M1b received therein. In other words, each of the magnet-receiving holes Ha and Hb may also be formed so as to have no vacant space unoccupied by the permanent magnet segment M1a or M1b. In addition, in this case, it would be possible to secure a large circumferential width Wf1 of the outer permanent magnets M1 (see FIG. 10), thereby increasing the torque.

(5) In the above-described embodiments, each of the inner permanent magnets M2 is received in the corresponding magnet-receiving recess He and fixed to the radially inner surface 15i of the corresponding second yoke portion 15d (see FIGS. 2-3).

However, the rotor core may be configured to further have a plurality of inner bridge portions each of which bridges (or connects) radially inner end parts of a circumferentially-adjacent pair of the first yoke portions 15a. Moreover, each of the inner permanent magnets M2 may be received and fixed in one of inner magnet-receiving holes that are defined by the first yoke portions 15a, the second yoke portions 15d and the inner bridge portions. In this case, with support of the inner bridge portions, it would be possible to more securely retain the inner permanent magnets M2 in the rotor 15. In addition, since the inner bridge portions could constitute part of a magnetic circuit, the gap G between the inner stator 14 and the rotor 15 would be reduced, thereby making it easier for magnetic flux to flow across the gap G.

(6) In the above-described embodiments, the housing 12 is comprised of the cup-shaped main body 12a and the disc-shaped cover 12b that is fixed to the main body 12a so as to cover the open end of the main body 12a (see FIGS. 1 and 21). However, the main body 12a and the cover 12b may have any other shapes such that the outer stator 13, the inner stator 14, the rotor 15 and the rotating shaft 18 can be received in the housing 12. Moreover, the cover 12b may be detachably attached to the main body 12a.

What is claimed is:
1. A double-stator rotating electric machine comprising:
a rotor;
an outer stator disposed radially outside the rotor with an outer gap formed therebetween, the outer stator having a first multi-phase coil wound thereon; and
an inner stator disposed radially inside the rotor with an inner gap formed therebetween, the inner stator having a second multi-phase coil wound thereon,
wherein
the outer stator is configured to form a plurality of magnetic poles upon energization of the first multi-phase coil,
the inner stator is configured to form a plurality of magnetic poles upon energization of the second multi-phase coil,
the number of the magnetic poles formed by the outer stator is equal to the number of the magnetic poles formed by the inner stator,
each of the magnetic poles formed by the outer stator is located at the same circumferential position as and has an opposite polarity to a corresponding one of the magnetic poles formed by the inner stator, thereby causing magnetic flux to flow in a radial direction of the rotor,
the rotor has a plurality of yoke portions each of which radially extends so as to form a magnetic flux passage magnetically connecting the outer and inner stators,
for each corresponding pair of the magnetic poles formed by the outer stator and the magnetic poles formed by the inner stator, the magnetic poles of the corresponding pair are both circumferentially bisected by a same imaginary line that extends in a radial direction of the rotor, and
the double-stator rotating electric machine further comprises a plurality of bridging wires that bridge the first and second multi-phase coils across the rotor on one axial side of the rotor, each of the bridging wires extending, without being wound on any stator core, obliquely with respect to both radial and circumferential directions of the rotor.

2. The double-stator rotating electric machine as set forth in claim 1, wherein the yoke portions are first yoke portions of the rotor,
the rotor further has a plurality of second yoke portions each of which extends in a circumferential direction of the rotor to connect an adjacent pair of the first yoke portions,
the second yoke portions have a smaller cross-sectional area perpendicular to the circumferential direction of the rotor than the first yoke portions, and
each of the second yoke portions has at least one outer permanent magnet arranged on its radially outer surface and at least one inner permanent magnet arranged on its radially inner surface, the at least one outer permanent magnet and the least one inner permanent magnet being each magnetized in the radial direction of the rotor.

3. The double-stator rotating electric machine as set forth in claim 2, wherein for each of the second yoke portions, the at least one outer permanent magnet arranged on the radially outer surface of the second yoke portion and the least one inner permanent magnet arranged on the radially inner surface of the second yoke portion are magnetized toward the same side in the radial direction of the rotor.

4. The double-stator rotating electric machine as set forth in claim 2, wherein a ratio of a circumferential width of the least one inner permanent magnet to a circumferential width of the at least one outer permanent magnet is in a range of 0.2 to 0.6.

5. The double-stator rotating electric machine as set forth in claim 2, wherein the number of all the inner permanent magnets arranged on the radially inner surfaces of the second yoke portions is less than the number of all the outer permanent magnets arranged on the radially outer surfaces of the second yoke portions, and a total circumferential width of all the inner permanent magnets arranged on the radially inner surfaces of the second yoke portions is smaller than a total circumferential width of all the outer permanent magnets arranged on the radially outer surfaces of the second yoke portions.

6. The double-stator rotating electric machine as set forth in claim 1, wherein each of the outer and inner stators has a plurality of teeth and a plurality of slots, the first multi-phase coil is wound on the teeth of the outer stator so as to be received in the slots of the outer stator, the second multi-phase coil is wound on the teeth of the inner stator so as to be received in the slots of the inner stator, and the yoke portions of the rotor have a greater circumferential width than the teeth of the outer stator and the teeth of the inner stator.

7. The double-stator rotating electric machine as set forth in claim 1, wherein the yoke portions are first yoke portions of the rotor, the rotor further has a plurality of second yoke portions each of which extends in a circumferential direction of the rotor to connect an adjacent pair of the first yoke portions, and a circumferential width of the first yoke portions is greater than a radial width of the second yoke portions.

8. The double-stator rotating electric machine as set forth in claim 1, wherein the yoke portions are first yoke portions of the rotor, the rotor further has a plurality of second yoke portions and a plurality of bridge portions, each of the second yoke portions extends in a circumferential direction of the rotor to connect an adjacent pair of the first yoke portions, each of the second yoke portions has at least one outer permanent magnet arranged on its radially outer surface, and each of the bridge portions extends in the circumferential direction of the rotor so as to bridge radially outer end parts of an adjacent pair of the first yoke portions and cover the least one outer permanent magnet arranged on the radially outer surface of the second yoke portion that connects the adjacent pair of the first yoke portions.

9. The double-stator rotating electric machine as set forth in claim 1, wherein the rotor includes a rotor core that is formed of a plurality of magnetic steel sheets laminated in an axial direction of the rotor, and the yoke portions are included in the rotor core.

10. A double-stator rotating electric machine comprising:
a rotor;
an outer stator disposed radially outside the rotor with an outer gap formed therebetween, the outer stator having a first multi-phase coil wound thereon; and
an inner stator disposed radially inside the rotor with an inner gap formed therebetween, the inner stator having a second multi-phase coil wound thereon, wherein
the outer stator is configured to form a plurality of magnetic poles upon energization of the first multi-phase coil,
the inner stator is configured to form a plurality of magnetic poles upon energization of the second multi-phase coil,
the number of the magnetic poles formed by the outer stator is equal to the number of the magnetic poles formed by the inner stator,
each of the magnetic poles formed by the outer stator is located at the same circumferential position as and has an opposite polarity to a corresponding one of the magnetic poles formed by the inner stator, thereby causing magnetic flux to flow in a radial direction of the rotor,
the rotor has a plurality of first yoke portions each of which radially extends so as to form a magnetic flux passage magnetically connecting the outer and inner stators,
for each corresponding pair of the magnetic poles formed by the outer stator and the magnetic poles formed by the inner stator, the magnetic poles of the corresponding pair are both circumferentially bisected by a same imaginary line that extends in a radial direction of the rotor,
the rotor further has a plurality of second yoke portions each of which extends in a circumferential direction of the rotor to connect an adjacent pair of the first yoke portions,
each of the second yoke portions has at least one outer permanent magnet arranged on its radially outer surface and at least one inner permanent magnet arranged on its radially inner surface, the at least one outer permanent magnet and the least one inner permanent magnet being each magnetized in the radial direction of the rotor,
for each of the second yoke portions, the at least one outer permanent magnet arranged on the radially outer surface of the second yoke portion and the least one inner permanent magnet arranged on the radially inner surface of the second yoke portion are magnetized toward the same side in the radial direction of the rotor,
a total number of the inner permanent magnets arranged on the radially inner surfaces of the second yoke portions is less than a total number of the outer permanent magnets arranged on the radially outer surfaces of the second yoke portions,
a total circumferential width of all the inner permanent magnets arranged on the radially inner surfaces of the second yoke portions is smaller than a total circumferential width of all the outer permanent magnets arranged on the radially outer surfaces of the second yoke portions, and
for each of the first yoke portions, a radial side toward which the at least one outer permanent magnet and the least one inner permanent magnet located on one circumferential side of the first yoke portion are magnetized is opposite to a radial side toward which the at least one outer permanent magnet and the least one inner permanent magnet located on the other circumferential side of the first yoke portion are magnetized.

* * * * *